US011132835B1

(12) United States Patent
Uhrenholt

(10) Patent No.: US 11,132,835 B1
(45) Date of Patent: Sep. 28, 2021

(54) SUSPENDING AND RESUMING OPERATIONS IN GRAPHICS PROCESSING SYSTEMS

(71) Applicant: Arm Limited, Cambridge (GB)

(72) Inventor: Olof Henrik Uhrenholt, Lomma (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/931,731

(22) Filed: Jul. 17, 2020

(51) Int. Cl.
*G06T 1/20* (2006.01)
*G06T 15/00* (2011.01)
*G06T 17/10* (2006.01)

(52) U.S. Cl.
CPC ............... *G06T 17/10* (2013.01); *G06T 1/20* (2013.01); *G06T 15/005* (2013.01)

(58) Field of Classification Search
CPC ......... G06T 1/20; G06T 15/005; G06T 17/10; G06F 9/3851; G06F 9/461; G06F 9/462; G06F 9/4812; G06F 9/4843
USPC .................................. 345/501; 718/102, 108
See application file for complete search history.

(56) References Cited

U.S. PATENT DOCUMENTS

| 2014/0184617 | A1* | 7/2014 | Palmer | ...................... | G06T 1/20 345/506 |
| 2019/0005604 | A1* | 1/2019 | Acharya | ............... | G06T 15/005 |
| 2019/0088009 | A1 | 3/2019 | Forey et al. | | |
| 2019/0163527 | A1* | 5/2019 | Acharya | .................... | G06T 1/20 |
| 2020/0065095 | A1* | 2/2020 | Underwood | .......... | G06F 9/3842 |

OTHER PUBLICATIONS

Uhrenholt, "Graphics Processing Systems," U.S. Appl. No. 16/931,719, filed Jul. 17, 2020.
Uhrenholt, "Graphics Processors," U.S. Appl. No. 16/931,754, filed Jul. 17, 2020.
Non-Final Office Action dated Apr. 15, 2021, U.S. Appl. No. 16/931,719.
Response to Non-Final Office Action dated Jul. 15, 2021, U.S. Appl. No. 16/931,719.
Notice of Allowance dated Aug. 10, 2021, U.S. Appl. No. 16/931,719.

\* cited by examiner

*Primary Examiner* — Jacinta M Crawford
(74) *Attorney, Agent, or Firm* — Vierra Magen Marcus LLP

(57) ABSTRACT

To suspend processing of a sequence of primitives being processed in a graphics processing pipeline the processing of primitives in a second section of the graphics processing pipeline in which the primitives are processed into graphics fragments is continued to generate respective sets of fragments. For each respective set of graphics fragments generated from this continued processing the set of fragments is passed from the second section of the graphics processing pipeline to a rendering circuit and the processing in respect of the respective fragments is then suspended. A set of suspend operation state information for the set of fragments indicating that the processing was suspended is then written out.

23 Claims, 10 Drawing Sheets

SUSPENDING AND RESUMING OPERATIONS IN GRAPHICS PROCESSING SYSTEMS

BACKGROUND

The technology described herein relates to the operation of graphics processors, and in particular to the suspending and resuming of graphics processing operations on a graphics processor.

Graphics processing is normally carried out by first dividing the graphics processing (render) output to be rendered, such as a frame to be displayed, into a number of similar basic components (so-called graphics "primitives") to allow the graphics processing operations to be more easily carried out. These "primitives" are usually in the form of simple polygons, such as triangles.

Each primitive is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated.

Once primitives and their vertices have been generated and defined (i.e. the primitive assembly operations are complete), the assembled primitives can be processed by the graphics processing system, in order to generate the desired graphics processing output (render output), such as a frame for display. This basically involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the output, e.g. scene to be displayed). This is typically done using the positions of the vertices of a primitive. The rendering process then derives the data, such as red, green and blue (RGB) colour values and an "Alpha" (transparency) value, necessary to represent the primitive at the sample points (i.e. "shades" each sample point). This can involve, for example, applying textures, blending sample point data values, etc. (The term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

A "fragment" is therefore effectively (has associated with it) a set of primitive data as interpolated to a given output space sample point or points of a primitive. It may also include per-primitive and other state data that is required to shade the primitive at the sample point (fragment position) in question.

Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.

It is also the case that as multiple fragments, e.g. from different overlapping primitives, at a given location may affect each other (e.g. due to transparency and/or blending), the final pixel output may depend upon plural or all fragments at that pixel location.

Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.

One form of graphics processing uses so-called "tile-based" rendering. In tile-based rendering, the two-dimensional render output (i.e. the output of the rendering process, such as an output frame to be displayed) is rendered as a plurality of smaller area regions, usually referred to as "tiles". In such arrangements, the render output is typically sub-divided (by area) into regularly-sized and shaped tiles (they are usually e.g., squares or rectangles).

This sub-division may be performed over multiple levels. For instance, the overall render output (e.g. frame) may initially be divided into a first set of tiles (which may be referred to as "metatiles", each covering a portion of the area of the overall render output, with the size of these metatiles being specified, e.g., by the application requiring the graphics processing), with the tiles in the first set of tiles then being further sub-divided at the graphics processor into smaller area rendering tiles, e.g. with the size of the rendering tiles determined based on the size of the graphics processor's available buffers, to further facilitate the rendering process.

In this way, a given processing task issued to the graphics processor, e.g. a draw call for rendering one of the larger metatiles specified by an application, can be effectively broken down by the graphics processor into a number of smaller tasks (e.g. rendering the respective, smaller area rendering tiles) which tasks are then typically worked through in sequence.

(Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass any and all alternative and equivalent terms and techniques wherein the render output is rendered as a plurality of smaller area regions.)

The advantage of such tile-based rendering is that primitives that do not appear in a given tile do not have to be processed for that tile, and therefore can be ignored when the tile is processed. This can allow the overall amount of graphics processing necessary for a given render output to be reduced.

In a tile-based rendering system, it is accordingly usually desirable to be able to identify and know those primitives that are actually present in a given region of the render output (which region may, e.g., represent a tile into which the overall render output has been divided into, or a set of multiple of such tiles), so as to, e.g., avoid unnecessarily rendering primitives that are not actually present in a region. In order to facilitate this, it is known to prepare lists of the primitives to be rendered for different regions of the render output (e.g. that will appear in the different regions of the render output). Such "primitive lists" identify, e.g. by reference to a primitive indicator, the primitives to be rendered for each region of the render output in question.

The process of preparing the primitive lists for regions of the render output basically therefore involves determining the primitives that should be rendered for a given region. This process is usually carried out by determining (at a desired level of accuracy) the primitives that intersect (i.e. that will appear (at least in part) within) the region in question, and then preparing a list of those primitives for future use by the graphics processing system. (It should be noted here that where a primitive falls into more than one region, as may frequently be the case, it is included in the primitive list for each region that it falls within.)

In effect, each region can be considered to have a bin (the primitive list) into which any primitive that is found to fall at least partially within (i.e. intersect) the region is placed (and, indeed, the process of sorting the primitives on a region-by-region basis in this manner is commonly referred to as "binning").

Thus, in a tile-based processing system there will be an initial, first processing pass which, in effect, sorts the graphics primitives (and/or other graphics entities, geometry, etc.) to be processed into regions that the render output has been divided into for sorting purposes. To do this, the graphics processor typically executes and implements a "tiling" pipeline.

The tiling pipeline executes the required geometry-related processing ("tiling") operations for preparing the primitive lists, such as obtaining vertex data for the primitives, vertex shading, bounding, binning, and so on. Once all of the primitives for the render output have been processed in this way, i.e. the tiling is complete, the graphics processor can then write the prepared primitive lists out (e.g. back to memory), so that the primitive lists can then be used to identify the primitives to be rendered for each tile when generating the desired render output, e.g. to display the frame.

The tiles are then rendered separately, typically one after another, in a second, deferred processing pass.

The rendering of each tile is generally performed by reading in an ordered sequence of primitives for the tile identified from the respective primitive list(s) for that tile and then performing the required graphics processing on the sequence of primitives to render the tile.

The rendering of a (and each) tile is typically also performed in a "pipelined" fashion. The graphics processor thus typically implements and executes a graphics processing pipeline (which may also be referred to as a rendering pipeline) including a sequence of processing stages for processing the primitives to generate a render output for the tile.

For instance, in the graphics processing pipeline for a tile-based system, for each tile that is to be rendered, a primitive list reader at the input of the graphics processing pipeline can identify from the respective primitive list(s) for the tile a sequence of primitives that are to be rendered for the tile. The sequence of primitives for the current tile is then issued into the graphics processing pipeline in an order specified by the primitive list(s) (which is typically the desired primitive draw order).

Once a sequence of primitives for a tile has entered the graphics processing pipeline, the primitives in the sequence then pass along the graphics processing pipeline, from each processing stage to the next, to thereby generate the render output.

For example, a primitive read in by the primitive list reader may typically first be subject to any required primitive assembly operations, before the assembled primitive is then passed along the graphics processing pipeline to suitable rasterising/rendering stages that act to perform the desired rasterisation/rendering of the primitive to generate rendered fragment data for the render output, e.g. in the manner described above.

The actual rendering of the fragments may be performed using a programmable processing stage, commonly referred to as a fragment (pixel) "shader". The fragment shader is a programmable processing stage that executes shader programs on input data values to generate a desired set of output data, such as appropriately shaded and rendered fragment data in the case of a fragment shader, for processing by the rest of the graphics processing pipeline and/or for output.

A graphics processor shader core is thus a processing unit that performs processing by running (typically small) programs for each "work item" in an output to be generated. When generating a graphics output, such as a render target, such as a frame to be displayed, a "work item" in this regard is usually a vertex or a sampling position in the case of a fragment shader.

In graphics processor shader operation, each work "item" will be processed by means of an execution thread which will execute the instructions in the shader program in question for the work item in question.

In order to execute shader programs, a graphics processor will include an appropriate execution unit or units (circuit or circuits) for that purpose. The execution unit(s) will include programmable processing circuit(s) for executing shader programs (the "shaders" of the graphics processing pipeline).

The actual data processing operations that are performed by the shader execution unit when executing that shader program are usually performed by respective functional units (circuits), such as arithmetic units (circuits), of the execution unit, in response to, and under the control of, the instructions in the (shader) program being executed. Thus, for example, appropriate functional units, such as arithmetic units, will perform data processing operations in response to and as required by instructions in a (shader) program being executed.

To generate a given render output (or region thereof) the graphics processor works through all of the tiles to be rendered for the render output (region) in question, with the respective sequence(s) of primitives to be rendered for each rendering tile (processing task) being passed into the graphics processing pipeline, and rendered, in turn.

The rendered tiles are then recombined to provide the complete render output (e.g. a frame, or a portion of a frame, for display).

Once all of the tiles for a given render output (region) have been rendered, the generation of that render output is then complete, and the graphics processor may then move on, e.g., to start generating a different render output.

However, there may be instances where the generation of a given render output has to be suspended before it can complete. For instance, it is becoming increasingly common for graphics processors to be used in data processing systems in which the graphics processor is, in effect, shared between multiple applications running concurrently. For example, this can arise in data processing systems that support hardware virtualisation using time-slicing, in which a given graphics processor may be performing graphics processing for multiple applications that are executing concurrently in a virtualised environment, with the graphics processor being shared between the different applications in a time division-based manner.

In this case, the graphics processor may be generating a render output for a first application, but then be required to switch to producing a render output for another application before it has completed the first render output. In that case therefore, the graphics processor will be required to suspend its processing of the first render output, so as to be able to switch to generating the second render output, but in such a way that it can then subsequently resume the processing of the first render output when the graphics processor returns to performing processing for the application that requires the first render output. This process will be repeated over time, as the graphics processor switches between generating render outputs for different applications that are "sharing" the graphics processor in the time division-based manner.

The Applicants accordingly believe that there is a need for an improved mechanism for suspending processing of a given render output on a graphics processor in such a way that the processing of the render output can then be resumed at a later date, and desirably in an efficient and relatively quick (in a low latency) manner.

BRIEF DESCRIPTION OF THE DRAWINGS

Various embodiments of the technology described herein will now be described by way of example only and with reference to the accompanying drawings, in which.

Like reference signs are used for like elements in the drawings where appropriate.

DETAILED DESCRIPTION

Figure 1:
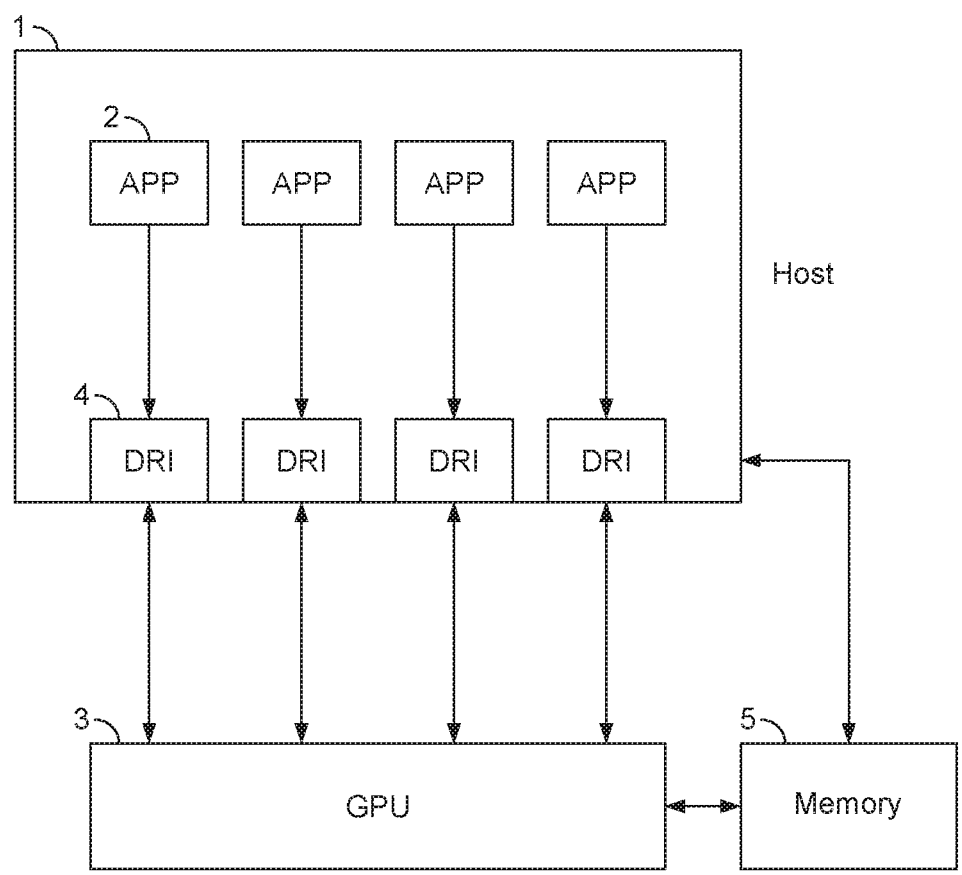
FIG. 1 shows an exemplary computer graphics processing system.

A first embodiment of the technology described herein comprises a method of operating a graphics processor, wherein the graphics processor executes a graphics processing pipeline that is operable to process graphics primitives to generate a render output, the graphics processing pipeline comprising, in sequence:

a first section in which graphics primitives are processed strictly in the order in which they were initially issued into the graphics processing pipeline;

a second section including one or more graphics processing circuits that operate on graphics primitives input to the second section of the graphics processing pipeline from the first section to generate from graphics primitives input to the second section respective sets of one or more graphics fragments to be rendered for the render output, wherein primitives in the second section of the graphics processing pipeline may be processed out of the order in which they were initially issued into the graphics processing pipeline; and a rendering circuit for rendering respective sets of one or more graphics fragments received from the second section of the graphics processing pipeline;

the method comprising:

in response to a command to suspend processing of a render output being generated by the graphics processor:

the graphics processor stopping issuing any new primitives associated with the render output into the graphics processing pipeline; and for a sequence of primitives currently being processed for the render output:

determining primitives within the sequence of primitives currently being processed that are currently in the second section of the graphics processing pipeline;

continuing the processing in the second section of the graphics processing pipeline for primitives determined to currently be in the second section of the graphics processing pipeline to generate from the primitives respective sets of one or more graphics fragments for rendering; and for each respective set of one or more graphics fragments generated from the processing in the second section of the graphics processing pipeline of a primitive that was determined to be in the second section of the graphics processing pipeline when the command to suspend processing was received:

passing the set of one or more graphics fragments generated from the processing of the primitive in the second section of the graphics processing pipeline to the rendering circuit and then suspending the processing in respect of the respective set of one or more graphics fragments; and writing out a set of suspend operation state information for the set of one or more graphics fragments indicating that the processing in respect of the set of one or more graphics fragments was suspended.

A second embodiment of the technology described herein comprises a graphics processor, wherein the graphics processor comprises a plurality of processing circuits configured to execute a graphics processing pipeline that is operable to process graphics primitives to generate a render output, the graphics processing pipeline comprising, in sequence:
- a first section in which graphics primitives are processed strictly in the order in which they were initially issued into the graphics processing pipeline;
- a second section including one or more graphics processing circuits that operate on graphics primitives input to the second section of the graphics processing pipeline from the first section to generate from each of the graphics primitives input to the second section a respective set of one or more graphics fragments to be rendered for the render output, wherein primitives in the second section of the graphics processing pipeline may be processed out of the order in which they were initially issued into the graphics processing pipeline;
- a rendering circuit for rendering respective sets of one or more graphics fragments received from the second section of the graphics processing pipeline; and
- a control circuit that is configured to operate the graphics processor such that:
  - in response to a command to suspend processing of a render output being generated by the graphics processor:
    - the control circuit causes the graphics processor to stop issuing any new primitives associated with the render output into the graphics processing pipeline; and
    - for primitives within a sequence of primitives currently being processed for the render output that are determined to currently be in the second section of the graphics processing pipeline:
      - the control circuit causes the graphics processor to continue the processing in the second section of the graphics processing pipeline for the primitives determined to currently be in the second section of the graphics processing pipeline to generate from the primitives respective sets of one or more graphics fragments for rendering and to pass each respective set of one or more graphics fragments generated from the processing in the second section of the graphics processing pipeline of a primitive that was determined to be in the second section of the graphics processing pipeline when the command to suspend processing was received to the rendering circuit;
      - the control circuit being further configured to suspend the processing in respect of a set of one or more graphics fragments generated from the processing in the second section of the graphics processing pipeline of a primitive that was determined to be in the second section of the graphics processing pipeline when the command to suspend processing was received after the set of one or more graphics fragments has been passed to the rendering circuit; and
      - the control circuit causing a write-out circuit to write out a set of suspend operation state information for the set of one or more graphics fragments indicating that the processing in respect of the set of one or more graphics fragments was suspended.

The technology described herein relates to the processing of graphics primitives when generating a render output (which may, e.g., represent a frame, e.g. for display). The technology described herein relates in particular to graphics processing operations in the situation where the generation of a (first) render output may be stopped, to be resumed at a later time (e.g. because there is a need to switch to generation of a second, different render output).

An example of this situation would be when switching between different applications in a virtualised environment, e.g. as described above, wherein the graphics processor (graphics processing unit (GPU)) is shared between multiple applications running concurrently, with the graphics processor generating respective render outputs for the different applications in an interleaved manner such that it may be required to (repeatedly) suspend/resume the processing of a (and each) render output.

However, there are various examples of other situations where it may be desired to be able to suspend, and subsequently resume, the processing of a given render output and the technology described herein may generally find utility in any suitable such situations.

The graphics processor of the technology described herein implements and executes a graphics processing pipeline to perform the graphics processing required to generate a given render output. A sequence of graphics primitives associated with a given processing task to be performed, e.g., a draw call for rendering a part of the render output may thus be issued into the graphics processing pipeline with the primitives being issued into the graphics processing pipeline for processing in a specified order, e.g., and in an embodiment, in a desired draw order for the primitives (although as will be explained below, the graphics primitives may subsequently be re-ordered within the graphics processing pipeline).

Thus, the technology described herein relates to such situations where it is desired (or necessary) to suspend generation of the render output mid-way through a render pass such that at the point at which a command to suspend processing is received the graphics processing pipeline is currently processing a sequence of graphics primitives for the render output (and wherein there may be further (sequences of) primitives yet to be processed for the first render output that are queued for execution by the graphics processing pipeline).

More particularly, the technology described herein relates to a mechanism for more efficiently suspending the processing of a section of graphics primitives within the sequence of primitives currently being processed that have already been partially processed in the graphics processing pipeline when the command to suspend generation of the first render output is received, as will be explained further below.

In this respect, the technology described herein recognises that the graphics processing pipeline can be divided into a number of different sections.

For instance, graphics primitives may be initially issued into a first section of the graphics processing pipeline, where the graphics primitives are then subject, e.g., and in an embodiment, to various primitive assembly operations (which may, and in embodiments do, include, e.g., vertex loading, primitive set-up, etc., operations).

A graphics processing pipeline may also, and in the technology described herein does, include a second section that processes the graphics primitives received from the first section of the graphics processing pipeline, e.g., and in an embodiment, by rasterising the primitives received from the first section, to generate respective sets of one or more graphics fragments (such as sets of four (2×2) graphics fragments, which may be referred to as a "quad", although other arrangements would of course be possible). The graphics fragments generated in this way are in an embodiment then subject to various fragment processing operations in the second section of the graphics processing pipeline (which fragment processing operations may, e.g., and in an embodiment, include early depth/stencil testing, and any other such operations that may be performed to, e.g., cull, the fragments) to determine which sets of graphics fragments should be rendered for the render output.

(To facilitate the rasterisation, as well as hidden surface removal, etc., it may be desirable to re-order at least some of the primitives in the second section of the graphics processing pipeline such that the primitives are processed out of the order in which they were initially issued into the graphics processing pipeline, and in the technology described herein this is therefore done. Thus, in the technology described herein, at least some of the primitives may be re-ordered at various stages of the graphics processing pipeline such that it can no longer be ensured that primitives in the second section of the graphics processing pipeline are still in their initially specified order. By contrast, in the first section of the graphics processing pipeline of the technology described herein the graphics primitives will be processed strictly in the order in which they were issued into the graphics processing pipeline.)

Any primitives whose associated sets of fragments survive the fragment processing operations in the second section of the graphics processing pipeline are then passed into a rendering circuit that renders the fragments to generate respective rendered fragment data for the render output.

Correspondingly, at the point at which a command to suspend processing of the current render output is received, the individual primitives within a sequence of primitives (e.g. a draw call) that is being processed for the render output will have reached different processing stages along the graphics processing pipeline.

As mentioned above, the technology described herein is concerned in particular with the suspending of processing for primitives that, at the point at which the suspend command is received, have already been partially processed in the graphics processing pipeline (e.g. such that the processing so far may already have produced observable effects for the render output, and such that at least some of the primitives may be out of their initial specified order) but which have not yet passed into the rendering circuit. These are, for instance, the primitives that are currently in the second section of the graphics processing pipeline according to the technology described herein.

It is thus the suspending (and resuming) of the processing of the primitives in the second section of the graphics processing pipeline that the technology described herein is particularly concerned with.

In the technology described herein, in response to receiving a command to suspend processing, rather than simply at that point immediately, e.g., storing out any and all required data, state, etc. needed to allow the processing of the primitives to be resumed at a later time, the processing of primitives that are currently in the second section of the graphics processing pipeline is allowed to continue up to a certain point in the graphics processing pipeline before the processing in respect of the primitives is stopped. Specifically, for any such primitives that are determined to currently be in the second section of the graphics processing pipeline when the suspend command is received, the processing in the second section of the graphics processing pipeline (e.g., the rasterisation, culling, etc.) is allowed to complete to generate from the primitives respective sets of one or more graphics fragments for rendering.

Each respective set of graphics fragments that is generated in this way from the continued processing of a primitive that was determined to be in the second section of the graphics processing pipeline when the suspend command was received is then passed from the second section of the graphics processing pipeline to the rendering circuit (e.g. in the normal way). However, rather than completing the rendering of the set of one or more graphics fragments, after the set of one or more graphics fragments has been passed to the rendering circuit the processing in respect of the set of one or more graphics fragments is stopped (e.g., and in an embodiment, by suspending the rendering operation in respect of the set of one or more graphics fragments), and a corresponding set of "suspend operation status" information is written out for the set of one or more graphics fragments indicating that this has been done.

In this way, as will be explained further below, the technology described herein may, e.g., facilitate reducing the amount of data that needs to be written out during the suspend operation, whilst still facilitating a relatively quicker (low latency) suspend operation (e.g. compared to completing the processing of all primitives in the graphics processing pipeline).

In particular, the technology described herein may provide a more efficient mechanism for handling the relatively large amounts of intermediate fragment state (data) that may typically be generated by the (out of order) processing of primitives in the second section of the graphics processing pipeline, which intermediate fragment state (data) may otherwise need to be written out in order to be able to safely resume processing of these primitives, e.g. if the processing of the primitives in the second section were to be suspended immediately.

In this respect it will be appreciated that the processing (e.g., the rasterisation, culling, etc.) of the primitives into respective sets of one or more graphics fragments in the second section of the graphics processing pipeline may start to produce observable effects for the render output.

The technology described herein therefore recognises that if the processing of the primitives currently in the second section of the graphics processing pipeline when the suspend command is received were simply discarded, and then repeated from the beginning when processing is resumed without, e.g., first clearing the associated fragment state (data) the repeated processing of the primitives may introduce observable artefacts into the render output. The technology described herein thus provides an efficient mechanism for clearing the intermediate fragment state (data) from the second section of the graphics processing pipeline (and thereby allowing the processing of the primitives to be safely stopped and then repeated from the beginning, e.g. without introducing observable artefacts into the render output, and avoiding the need to write out the intermediate fragments state (data)).

For instance, the effect of allowing the processing in the second section of the graphics processing pipeline to complete (and then suspending the processing in respect of the generated sets of fragments after they are passed from the second section to the rendering circuit) is thus to ensure that any intermediate fragment state (data) associated with the primitives currently in the second section of the graphics processing pipeline when the suspend command is received can be used/consumed in the normal way before stopping the processing in respect of the primitives. Thus any processing dependencies (e.g. for the (early) depth, stencil testing, etc.) are allowed to complete to ensure that the intermediate fragment state for these primitives is consistent and up-to-date before the processing is suspended. This then means there is no need to, e.g., track the dependencies or ordering of the primitives in the second section in order to be able to resume processing.

This in turn avoids the need for the suspend operation to write out any intermediate fragment state (data) associated with the primitives in the second section of the graphics processing pipeline when the suspend command is received (and in an embodiment therefore the intermediate fragment state (data) is not written out in respect of these primitives). This also correspondingly reduces the amount of data that needs to be retrieved from memory when resuming generation of the first render output, and correspondingly any need to provide additional data paths for reloading the necessary data.

In other words, by continuing the processing of the graphics primitives that are determined to currently be in the second section of the graphics processing pipeline in the second section of the graphics processing pipeline, passing the generated sets of graphics fragments through the graphics processing pipeline to the rendering circuit, and then suspending the processing in respect of the generated sets of graphics fragments only after they have been passed to the rendering circuit, the second section of the graphics processing pipeline can be (and is) effectively 'drained' of any intermediate fragment state (data) associated with those primitives.

Furthermore, it is a benefit in embodiments of the technology described herein that the intermediate fragment state (data) can be drained in a particularly efficient manner, e.g., and in an embodiment, without having to add any data pathways for handling the intermediate fragment state (since the intermediate fragment state is in an embodiment used/consumed in the normal way, e.g., using the existing data pathways, by allowing the processing of the primitives in the second section to continue to the rendering circuit).

Once the intermediate fragment state (data) has been drained from the second section of the graphics processing pipeline in this way, the associated primitives are no longer needed and can thus be discarded.

Instead, when processing is to be resumed, the graphics primitives for which processing was suspended in this way, i.e. that were in the second section of the graphics processing pipeline when the suspend command was received, can safely be (and in the technology described herein are) re-issued into the graphics processing pipeline and processed again from the beginning in order to rebuild the necessary intermediate fragment state (data) for the render output and to then complete the rendering of the primitives safely.

That is, in the technology described herein, when processing is to be resumed, the primitives that were in the second section of the graphics processing pipeline when the suspend command was received are re-issued into the graphics processing pipeline as a whole and then processed again to generate the respective sets of one or more graphics fragments, etc., in order to continue generating the render output.

The technology described herein further recognises that in this case some or all of the processing in respect of at least some of the sets of one or more graphics fragments generated from the processing of such re-issued primitives can, and in an embodiment should, be omitted when processing is resumed, e.g., if that processing in respect of a given set of one or more graphics fragments had already completed before processing of the render output was suspended. In the technology described herein the status of the processing for a given set of one or more fragments is indicated in the technology described herein by the respective suspend operation status information written out for the sets of one or more graphics fragments.

Thus, and as will be explained further below, when processing is resumed, the graphics processor of the technology described herein can determine using the suspend operation status information which of the sets of one or more graphics fragments generated from the repeated processing of the (re-issued) primitives need to be processed, and how. This facilitates a more efficient resume operation by avoiding repeating any processing that has already completed.

This also avoids repeating any processing that may not be safe to repeat when the primitives are re-issued into the graphics processing pipeline. For example, in embodiments where the fragments are subject to early depth/stencil testing in the second section of the graphics processing pipeline, the early depth/stencil testing, and associated updating of the depth buffer, will be performed during the suspend operation, and so does not need to be performed again when the primitives are re-issued, and in fact should not be performed again as this may (e.g.) risk corrupting the depth buffer (and therefore in the technology described herein when the primitives are re-issued in the graphics processing pipeline during the resume operation the early depth/stencil testing is in an embodiment bypassed for those sets of fragments whose processing was previously suspended).

Thus, it will be appreciated that the technology described herein may facilitate an improved, more efficient suspend (and resume) operation for suspending the processing of the primitives in the second section of the graphics processing pipeline, i.e. primitives that have already been partially processed in the graphics processing pipeline when the suspend command is received (and may hence facilitate an improved overall suspend mechanism).

The suspending of the processing in respect of the sets of one or more graphics fragments that are passed to the rendering circuit could be performed in any suitable manner. For example, the sets of one or more graphics fragments may be passed to a suitable input stage of rendering circuit that performs an appropriate suspend operation and, e.g., tracks which primitives and/or fragments were suspended.

However, in an embodiment the suspending of the processing in respect of the sets of one or more graphic fragments is performed by suspending the execution of a fragment shader program for rendering the set of one or more graphics fragments, e.g., and in an embodiment, in the manner described below.

Thus, in the technology described herein the rendering circuit of the graphics processing pipeline in an embodiment includes a programmable execution unit (a fragment shader) that acts to perform the desired fragment shading operations on the fragments generated in the second section of the graphics processing pipeline to thereby generate rendered fragment data for the render output. In particular, the fragment shading for a set of fragments is performed by the programmable execution unit (fragment shader) executing a respective fragment shader program for the set of fragments, wherein the programmable execution unit executes the fragment shader program for respective execution threads corresponding (e.g.) to respective individual fragments for the render output.

In embodiments the processing in respect of the sets of one or more graphic fragments is thus suspended by suspending the execution of a group of one or more execution threads that are currently executing a shader program for sets of one or more graphic fragments.

The fragment shader program will comprise a sequence of instructions to be executed. The set (sequence) of instructions being executed for the program can be any desired and suitable instructions. The program instructions may comprise, for example, one or more or all of: arithmetic (mathematical) operations (add, subtract, multiply, divide, etc.), bit manipulations (invert, swap, shift, etc.); logic operations (AND, OR, NAND, NOR, NOT, XOR, etc.); load-type instructions (such as varying, texturing or load instructions in the case of graphics processing); and store type instructions (such as blend or store instructions).

When executing an instruction in a program, the execution unit (e.g. the appropriate functional unit, such as an arithmetic unit, of the execution unit) is in an embodiment configured to read one or more input data values (operands), perform a processing operation using those input data values to generate an output data value, and then return the output data value, e.g. for further processing by subsequent instructions in the program being executed and/or for output (for use otherwise than during execution of the program being executed).

To facilitate this operation, each execution thread, when executing a shader program, is in an embodiment allocated a set of one or more registers for use by that thread when executing the shader program. That is, each execution thread of the programmable execution unit in an embodiment has an associated set of registers for storing data for the execution thread. The data may be loaded into the registers, and written out from the registers from and to an appropriate memory system of or accessible to the graphics processor (e.g. via an appropriate cache system (cache hierarchy)).

Thus, when executing a fragment shader program, the input data values to be used when executing an instruction for the fragment shader program are in an embodiment stored "locally" to the graphics processor in an appropriate set of registers (a register file) of and/or accessible to the execution (functional) unit, and the output data value(s) generated by the execution (functional) unit when executing the instruction will correspondingly in an embodiment be written back to that storage (register file).

Accordingly, in the graphics processing pipeline of the technology described herein, when a set of one or more graphics fragments that has been generated by the processing of a respective primitive in the second section of the graphics processing pipeline is to be passed to the rendering circuit in order to render the set of one or more graphics fragments, this in an embodiment involves generating a group (or groups) of one or more execution threads corresponding to the set of one or more graphics fragments for executing a respective fragment shader program for rendering the set of one or more graphics fragments.

In the technology described herein, this operation is in an embodiment performed in the same way after a suspend command is issued for the sets of one or more graphics fragments generated from the continued processing of the primitives that are in the second section of the graphics processing pipeline when the suspend command was received. However, in this case, once a group (or groups) of one or more execution threads has been generated for executing a respective fragment shader program for rendering a set of one or more graphics fragments associated with a primitive that was determined to be in the second section of the graphics processing pipeline when the suspend command was received, the execution of the fragment shader program for the respective set of one or more graphics fragments is in an embodiment then suspended, i.e. before the execution of the fragment shader program is complete.

In an embodiment the execution of the fragment shader program for the respective set of one or more graphics fragments is suspended after, e.g., and in an embodiment, immediately after, an instruction to load the initial input data values (operands) for the set of one or more graphics fragments to be rendered into the associated set of registers for the group of one or more execution threads that are to execute the fragment shader program for the set of one or more graphics fragments. In other words, the fragment shader program is in an embodiment allowed to execute up to, and including, the instruction to read in the required fragment input data values for the set of graphics fragments to the registers (the memory load operation may typically, and in an embodiment, be the first instruction in a set of instructions constituting the fragment shader program, although this need not be the case). However, the execution of the fragment shader program for the set of one or more graphics fragments is then suspended (in an embodiment immediately) after that instruction has executed.

Thus, in embodiments, prior to suspending the execution of the fragment shader program for a set of graphics fragments, the method comprises (the graphics processor) loading into the associated sets of registers for the group of one or more execution threads that are to execute the fragment shader program for the set of one or more graphics fragments a set of input data values for rendering the set of graphics fragments. The primitives are in an embodiment allowed to continue their processing up to this point, but once the appropriate input data has been loaded into the sets of registers for a group of one or more execution threads for the fragment shader program, the issuing, and execution of, instructions for execution by the group of one or more execution threads is in an embodiment then stopped.

However, other arrangements would be possible and the execution of the fragment shader program could, e.g., be suspended before the instruction to load the initial input data values. For instance, there is no general requirement to load the initial input values from memory during the suspend operation. Thus, in other embodiments, the execution of the fragment shader program may be suspended before the instruction to read in the required fragment input data values for the set of graphics fragments to the registers, e.g., and in an embodiment, so long as there are no outstanding dependencies for transactions that affect the content of the registers associated with the threads of the group of one or more execution threads (as discussed below). Once the execution of the fragment shader program for a set of graphics fragments has been suspended, the content of the registers associated with the threads of the group of one or more execution threads executing the fragment shader program for the set of one or more graphics fragments is in an embodiment then written out, e.g., to storage. This can then allow the execution of the fragment shader program for the set of one or more graphics fragments to be resumed from the next instruction to be executed in a straightforward and efficient manner.

In an embodiment this is done after waiting for any outstanding transactions for the group of one or more execution threads that affect the content of the registers associated with the threads of the group of one or more execution threads to complete, in order to ensure the register content is fully up to date (e.g. and consistent between the execution threads in the group). Waiting for outstanding transactions that affect the content of the registers associated with the threads of the group of one or more execution threads to be completed effectively ensures that all the data and state for the group of execution threads is located in the registers (the register file) and allows the execution of the fragment shader program to be suspended at an instruction boundary. This then reduces and simplifies the data that needs to be stored to memory for being able to resume execution of the fragment shader program as compared, for example, to having to store state and data from execution core slave units, such as a load/store unit, texture unit, etc.

Such transactions may, and in an embodiment do, comprise any pending (uncompleted) transactions that will affect the state and content of the registers (the register file) for the thread(s) of the thread group in question. As discussed above, this is so as to ensure that the content of the sets of registers (the register file) for the thread group in question is complete for the stage of the program execution that the thread group has reached.

In an embodiment, such transactions comprise at least memory transactions that relate to the transferring of data to/from the registers and memory, such as at least (memory) load and store transactions. Thus, in an embodiment, the operation comprises (and the processing circuit is correspondingly configured to) waiting for any outstanding memory transactions for the group of one or more execution threads to complete, before storing the register content to memory.

In an embodiment, the register-affecting transactions also or instead, and in an embodiment also include transactions being performed by "slave units" (e.g. hardware accelerators) of the graphics processor and which can be used by the programmable execution unit to perform particular processing operations when executing a shader program, such as, for example, a texture unit, a varying unit or a blending unit of the graphics processor. In such a case, the programmable execution unit may issue a request to such slave units to perform processing operations, with the result of the slave unit's processing then being written to the appropriate registers for the threads of the thread group in question. Thus, in such operation, it may be the case that the slave unit, such as the texture unit, will issue a memory request to fetch the associated (e.g. texture) data that it needs, and then use that fetched data (e.g. to perform a filtering operation), before then returning the result of the slave unit processing to the execution unit (to the registers associated with the threads of the thread group, as appropriate). In embodiments, the graphics processor accordingly also waits for any such "slave unit" transactions that will affect the content of the registers for the thread groups to complete before storing the register content to memory.

Thus, in an embodiment, the suspending of the execution of the fragment shader program is performed by: for the group of one or more execution threads currently executing the fragment shader program: stopping the issuing of shader program instructions for execution by the group of one or more execution threads; waiting for any outstanding transactions for the group of one or more execution threads that affect the content of the registers associated with the threads of the group of one or more execution threads to complete; and when any outstanding transactions for the group of one or more execution threads that affect the content of the registers associated with the threads of the group of one or more execution threads have completed: storing to memory: the content of the registers associated with the threads of the group of one or more execution threads; and in an embodiment a set of state information for the fragment shader program for the thread group, the set of state information including at least an indication of the last instruction in the fragment shader program that was executed for the threads of the group of one or more execution threads.

In the technology described herein, as mentioned above, when processing of the render output is to be resumed, the graphics primitives for which processing was suspended in this way are then passed through the graphics processing pipeline again and processed from the beginning to generate respective sets of one or more graphics fragments, etc., to rebuild the necessary fragment state that was drained during the suspend operation (although in an embodiment some or all of the processing in respect of the generated graphics fragments is omitted when the primitives are passed through the graphics processing pipeline again, as will be explained further below). Thus, the primitives for which processing was suspended in this way, i.e. that were in the second section of the graphics processing pipeline when the suspend command was received, will (when processing is resumed) pass through the graphics processing pipeline again to the rendering circuit.

The execution of the fragment shader program for the set of graphics fragments associated with the primitive can then be resumed appropriately, e.g. by re-loading in the register content that was written out, and then resuming the execution of the fragment shader program from the next instruction.

Thus, once the execution of a fragment shader program for a respective set of fragments has been suspended, the content of the associated sets of registers for the group of one or more execution threads executing the fragment shader program is in an embodiment also written out. This register content can then be re-loaded into respective registers of the programmable execution unit when the fragment shading operation for the associated set of fragments is resumed (when processing of the first render output is resumed).

The content of the sets of registers (register file) for the thread(s) of the group of one or more execution threads can be stored to any suitable and desired memory and in any suitable and desired manner. It should be and is in an embodiment stored in a way that facilitates restoring the data to appropriate sets of registers (the register file) for the threads of a thread group when the associated set of graphics fragments is passed again to the rendering circuit again when the processing of the primitive is repeated during the resume operation.

That is, to facilitate re-loading the register content when execution of a fragment shader program that has been suspended in this way is to be resumed, the content of the registers associated with the threads of the group of one or more execution threads executing a fragment shader program in respect of a given set of graphics fragments is in an embodiment written out, and stored, in such a manner that the set of one or more graphics fragments for which the fragment shader program was executing can be determined.

For example, it will be appreciated that when the processing of the primitives in the graphics processing pipeline is repeated on resume the group of execution threads that are to execute the fragment shader program for a set of one or more fragments generated from a given primitive may not be the same group of execution threads that was generated during the previous operation. The register content should therefore be and in an embodiment is stored in a manner associated with the respective sets of graphics fragments (or primitives) (e.g. rather than in a manner associated with the execution threads).

In an embodiment this is achieved by constraining the graphics processor to write out the register content in a certain order. Thus, in an embodiment, the content of the sets of registers for the execution thread(s) of the fragment shader programs executing for the different respective sets of graphics fragments that are being suspended in this manner are stored in a particular, in an embodiment selected, in an embodiment predetermined, order, for example, in an embodiment in the order in which the respective sets of graphics fragments are passed to the rendering circuit. In this way it is possible to reduce the amount of space required to store the register content. For instance, by writing out the register content in a predetermined order, e.g., and in an embodiment, the order in which the sets of graphics fragments are received at the fragment shader, the memory addressing can be simplified, as the graphics processor can then simply work through the data in order and read out the data in the correct order without requiring any explicit data to be stored identifying which register content applies to which set of graphics fragments.

In an embodiment, this ordering is enforced by the rendering circuit. For example, the rendering circuit is in an embodiment configured to write out the primitives in the desired primitive draw order. That is, the desired primitive draw order is in an embodiment enforced by the rendering circuit (after any out of order processing in the second section of the graphics processing pipeline).

In an embodiment, this ordering is enforced using various existing memory transaction dependencies associated with the respective fragment shader programs executing for the primitives (and the execution of which are in an embodiment suspended in the manner described above). For example, as described above, the suspend operation in respect of a fragment shader program in an embodiment comprises waiting for a memory load instruction to complete before suspending the execution of the fragment shader program. However, the graphics processor in an embodiment then further waits for other 'special purpose' dependencies to complete before writing the associated register content out, in order to enforce the desired ordering.

In an embodiment this is done using, e.g., tile buffer access dependencies associated with the primitives. In particular, the graphics processor is in an embodiment configured such that only the oldest set of fragments at a particular location (i.e. for a particular primitive) can access the tile buffer(s). Thus, by waiting for the tile buffer access dependencies to complete before writing out the register content, it is possible to enforce the primitive age order such that the register content for the sets of graphics fragments is written out in the desired primitive order.

This may be particularly beneficial since these dependencies are already present, and so provide a relatively easy mechanism for enforcing the desired ordering, e.g. without having to write out any additional data.

However, other arrangements would be possible and any other suitable mechanism for associating the stored register content with the respective sets of graphics fragments (and/ or with the associated primitives from which the graphics fragments were generated) may be used. For instance, it would also be possible to write out data explicitly identifying which set of graphics fragments the register content relates to.

Writing out and storing the register content in this way may be particularly beneficial since it may facilitate an improved (quicker) resume operation, e.g. since the register content can be loaded from its storage, e.g., and in an embodiment, local to the graphics processor, in order to resume execution of the fragment shader program (rather than starting execution of the fragment shader program again from the beginning). However, the rendering operation could also be repeated from the beginning, e.g. by re-loading the initial input data values (operands) for the fragment shader program from their original memory location (in which case the register content may be discarded during the suspend operation).

Thus, in the technology described herein, it is in an embodiment (only) the execution of the fragment shader program that is suspended in respect of the graphics primitives that are determined to be in the second section of the graphics processing pipeline when the suspend command is received, whereas the processing in the second section of the graphics processing pipeline is allowed to complete.

This provides a simpler mechanism for storing the required data to memory, since for the primitives that were in the second section of the graphics processing pipeline it is simply the content of the registers that needs to be stored to memory (and the graphics processor will already include and support an appropriate mechanism and circuits, data paths, etc., for doing that), as well as the suspend operation status information.

In this respect the Applicants have appreciated that allowing the primitives currently in the second section of the graphics processing pipeline to continue through the second section should not significantly affect the overall suspend latency (i.e. the time interval between the suspend command being issued and the generation of the render output in question actually being suspended such that the graphics processor can start generating a second, different render output).

For example, the primitives can usually be passed through the second section of the graphics processing pipeline using relatively few processing cycles such that the timescale for continuing the processing of the primitives in the second section of the graphics processing pipeline is typically shorter than the timescale, e.g., for writing out the data necessary for resuming the processing of the render output (such as, and in an embodiment including, the register content).

As mentioned above, this has been found to provide a particularly efficient mechanism for suspending the processing, e.g. with minimal additional complexity or additional data pathways. For instance, the graphics primitives that were determined to be in the second section of the graphics processing pipeline in an embodiment simply continue to run through graphics processing pipeline as normal until the execution of fragment shader program is suspended, e.g. as described above.

After the execution of the fragment shader program for a set of fragments has been suspended, a set of suspend operation status information is then written out for the set of fragments indicating that this has been done. As mentioned above, this suspend operation status information may facilitate the resume process by allowing the graphics processor to identify which sets of one or more graphics fragments were suspended in this way, and to then handle these sets of fragments appropriately during the resume operation, e.g. as will be explained further below.

Thus, for a set of one or more graphics fragments generated from a primitive that was currently in the second section of the graphics processing pipeline, and for which set of one or more graphics fragments the execution of a respective fragment shader program was therefore suspended, the suspend operation status data indicates that the execution of the respective fragment shader program for the set of graphics fragments associated with the primitive was suspended (accordingly a "suspended" status is written out).

Corresponding suspend operation status information is in an embodiment also written out in respect of the sets of fragments for the other primitives in the sequence of primitives, and/or in respect of the primitives, depending where they were in the graphics processing pipeline when processing was suspended.

A set of suspend operation status information is in an embodiment therefore written out in respect of all of the sets of graphics fragments and/or the associated primitives in the sequence of primitives being processed for the first render output (and not just in respect of those sets of fragments associated with primitives that were determined to be in the second section of the graphics processing pipeline when the suspend command is received).

For example, the suspend operation status data may indicate that the fragment shading for a given primitive has not yet started (this will be the case for primitives currently in the first section of the graphics processing pipeline, e.g. which have not yet been converted into fragments). Or, for primitives whose fragments have fully passed through the graphics processing pipeline, the suspend operation status data may indicate that all of the fragment shading operations for the primitive have completed (a shading "complete" status is written out).

An "error" status may also be returned, e.g. if the fragment shading suspend operation failed, or it is otherwise not possible to determine the fragment shading status for a given primitive (in which case the graphics processor may need to repeat all the processing from the beginning. Other "error case" handling arrangements could, of course, be used, if desired.).

The suspend operation status data for the entire first render output is in an embodiment then written out, e.g. as a bitmap, such that when processing is to be resumed the graphics processor can identify the processing status for each set of one or more graphics fragments generated from a respective primitive, and process the sets of fragments accordingly.

For instance, whilst embodiments have been described above in relation to processing of a single set of fragments for a single primitive, it will be appreciated that there may typically be a plurality of sets of fragments associated with a given primitive, and there will typically also be a plurality of primitives in the second section at the point at which the suspend command is received.

In an embodiment therefore each primitive (and/or each respective set of fragments) that is determined to be in the second section of the graphics processing pipeline when the suspend command is received is processed in the manner above, i.e. such that for each set of fragments generated from a primitive that was determined to be in the second section of the graphics processing pipeline, there is saved out an associated set of register content for a respective suspended fragment shader program, together with a set of suspend operation status information indicating that the execution of the fragment shader programs for these primitives was suspended.

Similarly, whilst the technology described herein in particular relates to a suspend operation of handling the processing of primitives that are in the second section of the graphics processing pipeline, there will typically be other primitives currently being processed in other sections of the graphics processing pipeline. The primitives in the other sections of the graphics processing pipeline can be, and in an embodiment are, handled differently to provide a more efficient overall suspend operation.

The technology described herein thus recognises that it is possible to determine which primitives are currently in which sections of the graphics processing pipeline when the suspend command is received, and that it may therefore be desirable to perform different suspend operations for primitives in different sections of the graphics processing pipeline, e.g. in order to improve the efficiency of the overall suspend operation (rather than, e.g., suspending the processing for all of the primitives for a given render output in the same way).

For instance, any primitives associated with the current render output that have not yet entered the graphics processing pipeline when the suspend command is received can simply be issued into the graphics processing pipeline when processing is resumed, and processed as normal. Thus, in response to receiving a suspend command, the graphics processor of the technology described herein in an embodiment stops (and in an embodiment immediately stops) issuing any new primitives for the first render output to the graphics processing pipeline.

Similarly, within a sequence of primitives currently being processed for the render output, there will be a first group of primitives for which the processing so far (at the point at which the suspend command is received) has not yet produced any observable effects for the render output, and for which primitives the processing can therefore safely be repeated again from the beginning, e.g. without risking introducing any artefacts into the render output. These are, e.g., and in an embodiment, primitives currently in the first section of the graphics processing pipeline according to the technology described herein.

Thus, in embodiments, the processing of any primitives currently in the first section of the graphics processing pipeline when the suspend command is received (and that are thus still in their initial specified order, and in an embodiment have not yet produced any observable effects for the render output), is stopped (and in an embodiment immediately stopped) in response to receiving the suspend command. In an embodiment these primitives are then discarded such that when generation of the first render output is subsequently resumed these primitives are processed again from the beginning, as if they were new primitives.

There will also be a group of primitives for which (all of) the fragment shading operations have already completed when the command to suspend processing is received, and for which the fragment shading accordingly does not need to be, and therefore should not be, repeated (i.e. primitives that have already passed through the graphics processing pipeline and have accordingly been rendered to generate (or update) the rendered fragment data for the first render output). So long as the graphics processor is able to identify the primitives whose fragments have all completed their fragment shading, there is no need to repeat the fragment shading for these primitives (and in an embodiment therefore this is not done).

Correspondingly, any primitives that have passed through the first and second sections of the graphics processing pipeline to the rendering circuit of the graphics processing pipeline, and that are therefore currently being rendered by the rendering circuit, i.e., and for which respective fragment shader programs are currently executing when the suspend command is received, may be allowed to complete their fragment shading such that this does not need to performed again when processing is resumed. However, the present Applicants have also recognised that it may be possible to suspend execution of a fragment shader program mid-way through its execution, e.g., and in an embodiment, at an arbitrary instruction boundary, in an embodiment in the manner described above, and this may therefore be done in embodiments of the technology described herein, e.g. to further reduce suspend latency.

Suspending the fragment shader program execution at an (arbitrary) instruction boundary facilitates more rapidly completing the suspend operation (thereby reducing the suspend "latency" (e.g., compared to arrangements in which any currently running execution threads execute their shader program to completion before being suspended)), and because the operation can be and is suspended at an instruction boundary, that reduces the potential peak suspend latency, and can also provide an upper bound on the suspend latency, since currently running threads can be and will be suspended (thereby, e.g., allowing threads which are running an infinite loop still to be suspended).

It will be appreciated that may also be other sequences of primitives to be rendered for the render output in question. Thus, whilst embodiments have been described in relation to the sequence of primitives currently being processed in the graphics processing pipeline, it will be appreciated that there may be typically be multiple sequences of primitives associated with a given render output. For example, graphics processing work to be performed for the render output may be broken into a series of processing tasks (e.g. draw calls) which can be queued for input to the graphics processing pipeline, with the processing tasks typically then being passed to the graphics processing pipeline for execution in sequence, one after another.

For example, a (and each) given processing task that is queued for input to the graphics processing pipeline (which processing task may, e.g., be the rendering of a particular tile from a set of plural tiles into which an overall, larger render output (e.g. a frame) has been divided for rendering purposes) may require processing of a respective sequence of plural graphics primitives. The graphics processor can then work through the processing tasks, and each of the primitives for each processing task, in turn in order to generate the desired render output.

For any processing tasks already completed when the suspend command is received (e.g., and for which all primitives have a shading "complete" status) it is not necessary to repeat the processing task on resume, and this is therefore not done. On the other hand, for any processing tasks that have not yet started, these can simply be queued again and issued into the graphics processing pipeline as normal. For processing tasks containing a mixture of primitives with different shading statuses, an explicit suspend mechanism is required, e.g. as provided by the technology described herein.

The technology described herein may thus provide an improved mechanism for suspending generation of a given (first) render output mid-way through a sequence of graphics primitives (i.e. a processing task) currently being processed for the render output, e.g., and in an embodiment, in a relatively quick (low latency manner), and in an embodiment whilst limiting the amount of additional data that needs to be written out during the suspend operation, e.g., in order to resume processing.

Once all of the sets of fragments for all of the primitives that were in the second section have been processed in this way (and any primitives in any other sections of the graphics processing pipeline have been appropriately suspended (e.g. whether this be by discarding the primitives or allowing the processing to complete)), the current rendered fragment data for the first render output is in an embodiment then written out.

For example, once all of the primitives have been appropriately suspended the graphics processor in an embodiment writes out the current rendered fragment data (e.g. colour, depth, etc., values) generated from the processing so far for the first render output such that the rendered fragment data can be re-loaded when generation of the first render output is to be resumed.

In the technology described herein, after the generation of a given render output has been suspended, the resulting rendered fragment data generated by the partial generation of the first render output (up to the point at which the processing was suspended) is in an embodiment written out to an appropriate "suspend" buffer from which it can be re-loaded as/when required, and held there until generation of the render output is resumed. In an embodiment this is done by writing out the current tile buffer(s) into the "suspend" buffer.

In embodiments, this suspend buffer may be stored intermediate between the graphics processor and the (e.g. main) memory system of an overall data processing system to which the graphics processor belongs, e.g. such that the data written out at the point of suspending the generation of the render output can be held (cached) relatively locally to the graphics processor to facilitate faster re-loading of the data. However other arrangements would be possible and the suspend buffer may be stored in any suitable portion of the memory system (which may be a portion of main memory, or a suitable cache system, etc.).

Any other data that is written out during the suspend operation process may also be written to the same suspend buffer. However, this is not necessary and the data that is written out may generally be stored in any suitable fashion.

Once the processing in respect of the primitives has been suitably suspended, and the current rendered fragment data has been written out (together with the suspend operation status information for the fragments and/or primitives, and in an embodiment the register content in respect of the sets of graphics fragments for which the execution of a respective fragment shader program was suspended where this is done, e.g. as described above), the suspend operation for the render output is then complete, e.g. to allow the graphics processor to commence (or resume) generation of a second, different render output.

It can be seen that the technology described herein therefore provides improved mechanisms for suspending (and resuming) graphics processing operations.

The technology described herein can be used in and with any suitable and desired graphics processing system and processor.

As explained above, the graphics processing pipeline in the technology described herein is divided into first and second sections. Graphics primitives are issued into first section, and processed thereby, before being passed into the second section.

For instance, and in an embodiment, when a sequence of primitives to be processed in the manner of the technology described herein is read into the graphics processing pipeline (which sequence of primitives may correspond to a particular processing task, e.g. rendering a single tile), each of the primitives in the sequence of primitives will initially be subjected to, in a first section of the graphics processing pipeline, various primitive assembly operations (which may, and in embodiments do, include, e.g., vertex loading, primitive set-up, etc., operations). During such primitive assembly, the primitives are processed strictly in the order in which they were initially issued into the graphics processing pipeline. For example, in a tile-based system, this will be the order in which the primitives for a tile are read out from the respective primitive list(s) for the tile.

In embodiments the primitives are issued to the graphics processing pipeline, and initially processed, in a desired primitive draw order. However, other arrangements for initially ordering the primitives would also be possible.

The first section of the graphics processing pipeline may include any suitable processing stages (circuits) that a graphics processing pipeline may have, so long as the processing stages (circuits) are configured to process the primitives in their initial specified order, and in an embodiment so long as the processing does not produce any observable effects for the render output.

For example, the first section of the graphics processing pipeline in an embodiment includes, in sequence, a resource allocator, and a primitive set-up stage (circuit). The first section thus, as described above, in an embodiment performs various primitive assembly operations that generate and define the primitives and their vertices such that the primitives can subsequently be rasterised/rendered.

The first section may also include, e.g., a vertex shader, in an embodiment between the resource allocator and primitive set-up stage (circuit). So long as the vertex shading does not produce any observable effects it is safe to repeat the vertex shading at this point in the graphics processing pipeline during the resume operation. In other embodiments, where the graphics processor is a tile-based system, the vertex shading may instead be performed by the tiler (tiling pipeline) during the tiling operation. Various arrangements would be possible in this regard.

In embodiments where the graphics processor is a tile-based system, the first section in an embodiment also includes a primitive list reader that reads in a respective, ordered sequence of primitives to be processed for the current processing task (i.e. tile, or sub-tile, that is to be rendered). This is in an embodiment the first stage of the first section of the graphics processing pipeline.

Of course, the first section need not include each of these stages, and/or may include any other suitable stages that might be present in this section of the graphics processing pipeline (so long as the primitives are processed in order and in an embodiment so long as no observable effects are produced).

In the first section of the graphics processing pipeline, the primitives are processed strictly in the order in which they were issued into the graphics processing pipeline. Furthermore, the processing in this section in an embodiment does not produce any observable effects for the render output (such that the processing can be repeated again from the beginning without risking introducing artefacts into the render output).

After the primitive set-up for a primitive in the first section of the graphics processing pipeline is complete, the assembled primitive may then be, and in an embodiment is, passed on to a rasteriser circuit in the next section of the graphics processing pipeline. The rasteriser circuit generates from the assembled primitives respective sets of one or more graphics fragments for rendering. The rasteriser (rasteriser circuit) can be configured to operate in any suitable and desired manner. For example, the rasteriser may generally operate to generate graphics fragments for processing in dependence upon which sampling points (or which sets of sampling points) of an array of sampling points covering the area of the render output, a given primitive, etc., received by the rasteriser covers (at least in part).

The rasteriser could in principle continue to process the graphics primitives strictly according to their initial order. However, it may be desirable for processing efficiency to be able to re-order at least some of the graphics primitives at this point (and, in an embodiment of the technology described herein, this is done). To this end, the graphics processing pipeline may, and in an embodiment does, include, e.g., a primitive re-order buffer, or other suitable mechanism for re-ordering the primitives between the first section of the graphics processing pipeline and the rasteriser (in the second section of the graphics processing pipeline).

Thus, in embodiments, the graphics processing pipeline includes a primitive re-ordering circuit. The primitive re-ordering circuit thus defines a re-ordering point within the graphics processing pipeline that, in effect, delimits the first and second sections of the graphics processing pipeline. That is, the first section of the graphics processing pipeline in an embodiment extends up to the last point in the graphics processing pipeline where the primitives are guaranteed to still be in their initial order, i.e. up to the re-ordering point within the primitive re-ordering circuit.

The re-ordering circuit may be provided in the form of a primitive re-order buffer. The primitive re-order buffer will contain a list of primitives, some of which have not yet been processed by the primitive re-ordering circuit (and so are still in order) and some of which have been processed by the primitive re-ordering circuit (and so are potentially out of order, although it may be the case that after processing in the primitive re-ordering circuit some of the primitives are still in order). It is thus possible to determine within the primitive re-order buffer the last point (i.e. primitive) at which the primitives are guaranteed to be in order such that beyond this point it can no longer be ensured that the graphics primitives are in their initially specified order. The re-ordering point thus defines the start of a second section of the graphics processing pipeline wherein it can no longer be guaranteed that primitives are still in the initial, specified order.

The second section of the graphics processing pipeline in an embodiment includes one or more fixed-function processing circuits. For example, in an embodiment, the second section includes a rasterisation circuit, as described above, as well as primitive culling stages (circuits) such as a depth (or depth and stencil) tester(s), etc. In an embodiment each of the stages in the second section of the graphics processing pipeline is implemented in hardware as a fixed-function unit. However, other arrangements would be possible.

Thus, in embodiments, after the processing of the graphics primitives to generate fragments (by the rasteriser), the fragments may then be culled, e.g. by depth testing, etc., operations, in order to reduce number of fragments that are passed to the renderer circuit, e.g. to avoid unnecessary rendering.

The result of the processing in the second section is therefore to generate a set of fragments that are to be rendered to generate the render output.

It will be appreciated that the in the second section of the graphics processing pipeline may therefore start to produce observable effects for the render output (such that it cannot safely be repeated from the beginning and such that an explicit mechanism for suspending the primitives in this section may be required, e.g. as provided by the technology described herein).

The rendering of a given primitive is then completed by shading the respective sets of fragments generated for the primitive to generate respective rendered fragment data for the render output.

Thus, any graphics fragments remaining after the processing so far in the second section are then passed to a rendering circuit, which performs the required fragment shading to generate the rendered fragment data (e.g. in the form of colour, depth, etc., values for the fragments).

The renderer (renderer circuit) of the graphics processor should be operable to render (shade) graphics fragments it receives to generate the desired output graphics fragment data. It may contain any suitable and desired rendering elements and may be configured in any suitable and desired manner. However, in an embodiment, as described above, the renderer comprises a fragment shader (a shader pipeline) (i.e. a programmable processing circuit that is operable to and that can be programmed to carry out fragment shading programs on fragments in order to render them).

Thus, the rendering circuit in an embodiment comprises a programmable execution unit operable to execute fragment shader programs, and in which when executing a fragment shader program, the programmable execution unit executes the fragment shader program for respective execution threads corresponding to respective fragments of a render output being generated.

When a set of one or more graphics fragments to be rendered is passed to the rendering circuit, a respective group (or groups) of one or more execution threads for executing a respective fragment shader program to generate rendered fragment data for the render output for the set of one or more graphics fragments is generate (spawned) (the execution of which fragment shader program is in an embodiment however then suspended, e.g. in the manner described above).

The group of one or more execution threads that is generated to execute a fragment shader program for a set of one or more graphics fragments can comprise as many execution threads as there are fragments in the set. For instance, in an embodiment, the sets of graphics fragments are sets of four (2×2) graphics fragments ("quads") and the group of execution threads may therefore comprise four execution threads. However, other arrangements would be possible.

In an embodiment, the graphics processor and the programmable execution unit is operable to execute shader programs for groups ("warps") of plural execution threads together, in lockstep, one instruction at a time, and the group of one or more execution threads for which execution of the shader program is suspended comprises such a thread group (warp).

The graphics processor may comprise a single programmable execution unit, or may have plural execution units. Where there are a plural execution units, each execution unit can, and in an embodiment does, in an embodiment operate in the manner of the technology described herein.

Where there are plural execution units, each execution unit may be provided as a separate circuit to other execution units of the data processor, or the execution units may share some or all of their circuits (circuit elements).

The (and each) execution unit should, and in an embodiment does, comprise appropriate circuits (processing circuits/logic) for performing the operations required of the execution unit.

Thus, the (and each) execution unit will, for example, and in an embodiment does, comprise a set of at least one functional unit (circuit) operable to perform data processing operations for an instruction being executed by an execution thread. An execution unit may comprise only a single functional unit, or could comprise plural functional units, depending on the operations the execution unit is to perform.

The functional unit or units can comprise any desired and suitable functional unit or units operable to perform data processing operations in response to and in accordance with program instructions.

The graphics processor in an embodiment also comprises any other appropriate and desired units and circuits required for the operation of the programmable execution unit(s), such as appropriate control circuits (control logic) for controlling the execution unit(s) to cause and to perform the desired and appropriate processing operations.

Thus the graphics processor in an embodiment also comprises an appropriate thread group execution controller (scheduler) circuit, which is operable to issue thread groups to the programmable execution unit for execution and to control the scheduling of thread groups on/to the programmable execution unit for execution.

As mentioned above, as well as the programmable execution unit, the graphics processor includes a group of plural registers (a register file) operable to and to be used to store data for execution threads that are executing. Each thread of a group of one or more execution threads that are executing a shader program will have an associated set of registers to be used for storing data for the execution thread (either input data to be processed for the execution thread or output data generated by the execution thread) allocated to it from the overall group of registers (register file) that is available to the programmable execution unit (and to execution threads that the programmable execution unit is executing).

The group(s) of registers (register file(s)) can take any suitable and desired form and be arranged in any suitable and desired manner, e.g., as comprising single or plural banks, etc.

The graphics processor will correspondingly comprise appropriate load/store units and communication paths for transferring data between the registers/register file and a memory system of or accessible to the graphics processor (e.g., and in an embodiment, via an appropriate cache hierarchy).

Thus the graphics processor in an embodiment has an appropriate interface to, and communication with memory (a memory system) of or accessible to the graphics processor.

The memory and memory system is in an embodiment a main memory of or available to the graphics processor, such as a memory that is dedicated to the graphics processor, or a main memory of a data processing system that the graphics processor is part of. In an embodiment, the memory system includes an appropriate cache hierarchy intermediate the main memory of the memory system and the programmable execution unit(s) of the graphics processor.

The result of this fragment shading, i.e. the rendered fragment data (e.g. colour, depth, etc., values) is in an embodiment then stored in appropriate buffers from which it can ultimately be written out, e.g. to a frame buffer for display. Thus, in embodiments, the renderer will process the fragments it receives to then generate output rendered fragment data, which rendered fragment data is then in an embodiment written to an output buffer, such as a frame buffer, in an embodiment in external memory, for use (e.g. to display a frame on a display). The rendered fragment data may be written to the (external) output buffer via an intermediate buffer, such as a tile (e.g. colour) buffer (as will be the case in a tile-based graphics processing system).

The tile buffers store fragment colour, etc., values to be applied to the render output and can be configured in any appropriate and desired manner. The tile buffers should, and in an embodiment do, store a colour, etc. value for each sampling position of the render output (e.g. tile) that is being generated. Thus the tile buffer for a tile should, and in an embodiment does, store a current colour, etc., value for each sampling position within the tile in question. The colour, etc. values stored in the tile buffers should be, and are in an embodiment, stored and updated as primitives are rasterised/ rendered to generate new fragment output data.

In an embodiment, a depth value for an output fragment is also written appropriately to a depth (Z) buffer within the tile buffers.

For instance, as mentioned above, and in an embodiment, the second section of the graphics processing pipeline may include an (early) depth testing circuit that is operable to perform an (early) depth test on fragments generated by the rasteriser.

To do this, the (early) depth testing circuit in an embodiment compares the depth value of (associated with) a fragment received at the (early) depth testing circuit with depth values of graphics fragments that have already been rendered to determine whether the new fragments will be occluded by fragments that have already been rendered (or not). These depth values are stored in a depth (Z) buffer that is part of the tile buffers and the depth values stored in the depth buffer should be, and are in an embodiment, stored and updated as primitives are processed.

At the same time, an early stencil test is in an embodiment carried out. In this case, fragments may also have an associated stencil value that can be tested against a respective set of, e.g. stencil function, values, which may in an embodiment take the form of minimum and maximum stencil vales. Similarly to the depth values, the stencil values may also be stored in a suitable buffer, and in an embodiment updated on the basis of the stencil test. In an embodiment, the graphics processing pipeline comprises a combined early depth/stencil testing circuit.

If it is determined by the (early) depth/stencil testing that a fragment would be occluded by a fragment that has already been rendered, there is then no need to render the fragment, and this is therefore in an embodiment not done (and the fragment can then be discarded, or "culled"). This can help to avoid sending fragments that are occluded by already processed primitives through the rendering pipeline. In this way, it is possible to reduce the amount of "overdraw", i.e. to avoid performing multiple, ultimately redundant, rendering operations for a given sampling point (e.g. when a first received and rendered primitive is subsequently covered by a later primitive, such that the rendered first primitive is not in fact seen at the sampling point(s)) in question).

In addition to what has been described above, the graphics processing unit (processor) (processing pipeline) can include, and in an embodiment does include, any one or more, and in an embodiment all, of the processing stages that a graphics processor (processing pipeline) can normally include.

In particular, where the graphics processor is tile-based, graphics processor may also implement and execute a tiling pipeline for generating the primitive lists. Thus, whilst embodiments are described above in relation to the rendering of primitives to generate a given render output, which rendering is in an embodiment performed using a set of previously generated primitive lists, the graphics processor is in an embodiment also operable to perform (e.g. in an earlier processing pass) the tiling operations for generating the primitive lists.

Thus, in general, the graphics processor (processing pipeline) may also contain any other suitable and desired processing stages that a graphics processing pipeline may contain such as a hull shader, a tessellation stage (e.g. where tessellation is performed by executing a shader program), a domain (evaluation) shading stage (shader), a geometry shading stage (shader), a fragment shader, a blender, a write out unit etc.

As described above, the technology described herein relates particularly to the operation of the graphics processor when a command to suspend processing for a render output is received, such that the generation of the render output is interrupted (and generation of the render output cannot (yet) be completed).

Such a requirement to suspend processing of a current render output can arise, e.g., in the case where the graphics processor is being shared between multiple different applications that require graphics processing, e.g. on a time division basis. In this case, the time "slice" for generating a render output for a first application may expire before the render output is completed, such that the graphics processor will need to suspend processing of that render output and switch to processing a different render output, but then be able to resume processing of the first render output when the next time "slice" for that render output occurs.

The overall suspend operation itself can be instigated in any suitable and desired manner and by any suitable and desired component of the overall data processing system that the graphics processor is part of. In an embodiment, the suspend operation will be triggered by some overall controller or control process, that is controlling the sharing of the graphics processor between the different applications, etc. In the case of a virtualised hardware arrangement, then the suspend operation is in an embodiment initiated by the appropriate overall controller for the virtualised hardware, such as a hypervisor.

In an embodiment, the signal (the suspend command) that is sent to the graphics processor is sent by an appropriate driver of (for) the graphics processor, e.g. that is executing on a host processor of the overall data processing system that the graphics processor is part of. In this case therefore, the driver will, e.g., receive a suspend command from an overall controller, e.g. hypervisor, of the data processing system, with the driver then in response to that issuing a corresponding suspend command to the graphics processor. In the case of a virtualised hardware environment, there may be multiple drivers controlling their respective operations on the graphics processor, in which case, the overall suspend command will be sent to the driver whose particular graphics processing operation is to be suspended, with that driver then correspondingly signalling the graphics processor to suspend the processing for that driver.

In an embodiment, in order to facilitate the waiting for any outstanding processing for primitives in the second section of the graphics processing pipeline complete (e.g., and in an embodiment, any primitives ahead of a selected "boundary" primitive, as will be described further below), the suspending of the processing for the render output being generated is performed by and under the control of the driver for the graphics processor for that render output, so that the driver is permitted to retain control of the graphics processor until the suspend operation has been completed (in contrast, e.g. to the driver being forced to relinquish control of the graphics processor (and the graphics processor being forcibly switched to start processing a different render output) when the suspend command is received).

This will then avoid the graphics processor being switched to generating a different render output, before the suspend operation in the manner of the technology described herein has been completed. (In these arrangements, a "backstop", default timeout operation may be implemented, such that the graphics processor will still be forced to switch to generating a different render output if the suspend operation has not been completed within a particular, in an embodiment selected, in an embodiment predetermined time period (e.g. number of cycles), so as to allow render output switching in any event, even if the suspend operation for some reason fails to complete successfully.) (In this case, the render output generation that was forcibly suspended can then be handled in an appropriate manner on resumption of processing for that render output, for example by simply assuming that the generation of the render output failed and restarting the generation of the render output from the beginning. Other "error case" handling arrangements could, of course, be used, if desired.)

Correspondingly, when a suspend operation is initiated, the graphics processor is in an embodiment configured to and allowed to clean up its state, service any page faults and/or perform cache maintenance operations, before yielding control of the graphics processor to start generating the new render output. Again, this then facilitates "clean" switching of the graphics processor between generating different render outputs, whilst facilitating more efficient and "clean" resumption of the processing of the render output at a later time.

Thus, in an embodiment, where the technology described herein is being used in a virtualised system, the technology described herein is used in a virtualised system that operates according to "collaborative virtualisation" principles.

It will be appreciated that in the technology described herein the generation of a first render output is in an embodiment suspended in order to allow the graphics processor to start (or resume) generating a second render output. Thus, in embodiments, a suspend command is issued to the graphics processor when it is desired to switch from generating a first render output to generating a second, different render output.

Thus, in embodiments, the method comprises: operating the graphics processor to generate a first render output; in response to receiving a command to suspend generation of the first render output, suspending the generation of the first render output in the manner described above; and then once the generation of the first render output has been suspended, operating the graphics processor to generate a second render output. The method in an embodiment comprises, at a later point, suspending generation of the second render output.

In one embodiment, once the second render output is suspended, the graphics processor then resumes processing of the first render output. However, there may be more than two different render outputs being generated in a time-shared manner, and so the graphics processor may, e.g., suspend generating the second render output and start generating a third (or further) render output before resuming the first render output. The division of the graphics processor resource between the different render outputs is in an embodiment determined by an overall controller, such as a hypervisor, as explained above. Further, the switching is in an embodiment performed such that the graphics processor is allowed to finish the suspend operations for the first render output before control is relinquished to another application to start generating a second render output.

As described above, in the technology described herein, in response to receiving a command to suspend processing of the first render output, the graphics processor stop issuing new primitives associated with the first render output.

The graphics processor in an embodiment also stops the processing of any primitives determined to currently be in the first section of the graphics processing pipeline when the suspend command is received, and that have thus far not produced any observable effects, and are still in their initial specified order (i.e. such that processing of these primitives can be safely repeated from the beginning).

To identify such primitives, in an embodiment, a suspend operation "boundary" primitive is selected having a position within the sequence of primitives such that it can be guaranteed that all primitives in the sequence of primitives that are behind the position of the selected boundary primitive within the sequence of primitives are currently in the first section of the graphics processing pipeline, and are thus in order, whereas any primitives in the sequence of primitives that are currently in the second section of the graphics processing pipeline, and that may thus be out of order, are ahead of the selected boundary primitive.

The processing of any graphics primitives in the sequence of graphics primitives that are behind the selected boundary primitive can then be (and in an embodiment is) stopped.

Thus, in an embodiment, in response to a command to suspend processing of the current render output, a request can be (and is) issued to a primitive re-ordering circuit of the graphics processing pipeline (where present) to return the position of the boundary primitive. That is, in embodiments, the graphics processing pipeline includes a primitive re-ordering circuit, and the selected boundary primitive is a primitive in the primitive re-ordering circuit that is guaranteed to still be the initial order, and wherein in response to receiving a command to suspend processing of the first render output, the primitive re-ordering circuit returns a primitive identifier for the selected boundary primitive.

For primitives whose fragment shading has already completed when the suspend command is received, there is no need to repeat the fragment shading operations, and in an embodiment this is therefore not done. To facilitate this, a "base" primitive within the sequence of primitives may be identified, the "base" primitive representing the earliest primitive in the sequence of primitives for which the fragment shading operations have not completed (or, equivalently, the first primitive for which the fragment shader program execution was suspended, which may, e.g., be the earliest primitive determined to be in the second section of the graphics processing pipeline (although this need not be the case, e.g., if currently executing fragment shader programs are also suspended)).

For instance, it will be appreciated that the rendering circuit will write out the primitives in the desired draw order (that is, the rendering circuit will in an embodiment write out the rendered fragment data in the desired primitive draw order). This ensures that the primitives drain from the rendering circuit in the desired primitive draw order such that it can be guaranteed that any primitives ahead of the first primitive that has a "suspended" suspend operation status have already completed their fragment shading. The graphics processor can therefore select, e.g., this primitive as a base primitive from which processing should be resumed. The graphics processor when resuming generation of the render output can then fast-forward through the sequence of primitives for which processing was suspended and resume processing from an appropriate point (primitive), i.e. based on the base primitive.

The boundary and base primitives thus identify a section of primitives that are currently in the second section of the graphics processing pipeline, or that are already in the fragment shader, and whose processing can be suspended in the manner described above.

In an embodiment, suitable primitive identifiers identifying the positions of the boundary and base primitives are therefore also written out to allow the graphics processor to resume processing from the appropriate position in the sequence.

The above primarily describes the operation when graphics processing that is generating a given render output is to be suspended. It will be appreciated from the above, that when graphics processing is suspended in the manner of the technology described herein, there will be a need to, and the intention is that, the graphics processing is resumed at a later time. The technology described herein also extends to the corresponding operation of resuming graphics processing that has previously been suspended in the manner of the technology described herein.

The resume operation should be, and is in an embodiment, in effect, the reverse (the inverse) of the suspend operation (and flow).

Thus, the graphics processor will receive a resume command, which, inter alia, indicates which graphics processing operation (render output generation) (graphics processing context) is to be resumed.

In response to receiving a command to resume generation of a render output (that was previously suspended, e.g. in the manner described above), the graphics processor then resumes processing for the render output, and in an embodiment resumes processing of the sequence of primitives for which processing was suspended, in an embodiment starting from the base primitive (as described above). Thus, the graphics processor in an embodiment 'fast forwards' through the sequence(s) of primitives for the first render output and resumes processing from the point (primitive) at which processing was suspended. This then avoids having to process any primitives for which the rendering had already completed before the operation was suspended, thereby providing quicker resume operation (e.g. compared to starting the generation of the first render output from the beginning).

The graphics processor then loads in the rendered fragment data values (the colour, etc., buffer), in an embodiment as well as the depth buffer, and any other information that was written out for the render output when processing was suspended.

As described above, because for the primitives that were in the second section of the graphics processing pipeline when the suspend command was issued the processing in the second section was allowed to complete, to thereby drain the associated intermediate fragment state (data) from the second section of the graphics processing pipeline, the graphics primitives that were in the second section of the graphics processing pipeline when the suspend command was issued should therefore be (and are) passed through the graphics processing pipeline again and processed from the beginning in order to rebuild any necessary fragment state.

The primitives that were in the second section of the graphics processing pipeline when the suspend command was received are thus in an embodiment re-issued into the graphics processing pipeline, and in an embodiment rasterised, etc., (again) to re-populate the fragment state required for the fragment shading.

Thus, in the resume operation according to the technology described herein, the primitives that were in the second section of the graphics processing pipeline when the suspend command is received are re-issued into the graphics processing pipeline when processing is resumed, and processed again.

Thus, in embodiments, after the generation of the render output has been suspended, the method further comprises: the graphics processor receiving a command to resume processing of the render output, and in response to receiving a command to resume processing of the render output: loading in for a sequence of primitives that was being processed for the render output when the processing was suspended a set of suspend operation status information indicating for which primitives in the sequence of primitives the processing was previously suspended (in the manner of the technology described herein); determining based on the set of suspend operation status information a section of primitives in respect of which the processing was suspended during a previous suspend operation; issuing the primitives for which it is determined that the processing was previously suspended into the graphics processing pipeline and repeating at least some of the processing for the primitives in the graphics processing pipeline to generate from the primitives respective sets of one or more graphics fragments for rendering; and passing the generated sets of one or more graphics fragments to the rendering circuit for rendering to continue generating the render output.

However, the Applicants have appreciated that not all of the processing in the second section of the graphics processing pipeline needs to be repeated for these primitives when processing is resumed, and in some cases it should not be.

For instance, the technology described herein recognises that the primitives that were in the second section of the graphics processing pipeline may generally comprise a mixed state of fragments including some sets of fragments for which the fragment shading was completed, and some sets of fragments for which the fragment shading was suspended. Thus, when the primitives are re-issued into the graphics processing pipeline some or all of the processing for at least some of the sets of fragments does not need to be performed again, and in the technology described herein this is in an embodiment avoided.

In particular, the graphics processor of the technology described herein is able to determine which sets of graphics fragments had already completed their fragment shading before processing was suspended from the associated suspend operation status information. In that case, if a given set of fragments had already completed its fragment shading (and this is indicated by the respective suspend operation status information) some or all of the processing in respect of the set of fragments can be bypassed on the resume operation. For example, there is no need to repeat the fragment shading (since this has already been done). Thus, when the set of fragments is passed to the rendering circuit, the set of fragments can then be discarded, e.g. without generating a group of execution threads to execute a respective fragment shader program, etc.

On the other hand, for those sets of graphics fragments for which the execution of a respective fragment shader program was previously suspended (as indicated by the suspend operation status information), when the set of graphics fragments arrives at the rendering circuit the programmable execution unit of the rendering circuit can in an embodiment load in the register content that was written out for the sets of graphics fragments, and then resume execution of the fragment shader program accordingly.

(For those sets of graphics fragments whose fragment shading had not yet started (e.g. those generated from primitives that had not yet reached the second section of the graphics processing pipeline when processing was suspended), the fragment shader program can be executed in the normal manner, by generating a corresponding group of execution threads, etc., as normal.)

Furthermore, any of the processing of the fragments (after the rasterisation) in the second section of the graphics processing pipeline that may produce observable effects should not be, and in an embodiment is not, repeated during the resume operation. For example, all of the primitives that were in the second section of the graphics processing pipeline when processing was suspended will have already been subjected to early depth/stencil testing (where this is performed) as the processing in the second section is allowed to continue before the processing in respect of the fragments is suspended, and there is no need to repeat the early depth/stencil testing (since the effects of this are already known), and this should not be done since this may potentially corrupt the depth buffer (and therefore in the technology described herein this is in an embodiment not done).

Thus, for the sets of fragments that were in the second section of the graphics processing pipeline when the suspend command was received, and for which the processing (including the early depth/stencil testing) in the second section was allowed to complete before the processing in respect of the fragments was stopped, the early depth/stencil testing can be, and in an embodiment is, bypassed on resume. The graphics processor can identify these sets of fragments based on the associated suspend operation status data (as these primitives will have a "suspended" status).

In an embodiment the early depth/stencil testing is bypassed for all fragments that were in the second section of the graphics processing pipeline when the suspend command was received. For example, any early depth/stencil fragments will have already completed their early depth/stencil operation during the draining of the second section of the suspend. On the other hand, for any late depth/stencil fragments the depth/stencil testing is in an embodiment performed by the fragment shader. All late depth/stencil fragments therefore skip the early depth/stencil operation (since they should be done late).

In general, any processing which if repeated during the resume operation would potentially introduce artefacts should similarly be bypassed when the primitives are passed through the graphics processing pipeline again.

However, all other state processing is in an embodiment performed as normal. For example, any processing required for, e.g., managing the depth/stencil testing dependencies, and/or the pixel (colour buffer) dependencies, should be performed again in order to re-create the required dependency state. It is safe to repeat such processing since the depth/stencil and pixel dependency states do not have any observable effects themselves, e.g. since they are not written to a buffer in memory, but are instead completely handled by the graphics processing pipeline (units) without any path to memory. Thus, during the resume operation, such state is naturally re-built by re-issuing the primitives to the graphics processing pipeline.

Thus, after the primitives have been (e.g.) rasterised into respective sets of one or more graphics fragments, the graphics processor in an embodiment then reads in the suspend operation status information that was written out during the suspend operation, and determines based on the suspend operation status information which sets of graphics fragments need to be processed, and how.

In an embodiment the suspend operation status information is read in after the rasterisation circuit and before the early depth/stencil testing, e.g. in an early depth/stencil re-order buffer. However, this need not be the case and the suspend operation status information may be read in at other positions so long as it is available when it is needed (e.g. before thread group creation in order to determine if the fragment should spawn a thread group or not).

In an embodiment therefore the processing of the primitives during the resume operation is selectively performed based on the indicated suspend operation status information. That is, when the primitives for which the processing was previously stopped are re-issued into the graphics processing pipeline, at least some of the processing in the graphics processing pipeline may be bypassed during the resume operation. However, regardless of this, in the technology described herein all of the primitives whose fragments hadn't all reached the rendering circuit when the command to suspend processing was received are run through the graphics processing pipeline again.

This includes any primitives for which the fragment shading had not yet started (e.g. since they were in the first section, and thus discarded, or since they had not yet entered into the graphics processing pipeline). These are in an embodiment the primitives behind a selected "boundary" primitive (as discussed above). Any primitives for which fragment shading was not yet started can thus be (and are) rendered as normal (as new primitives).

For primitives whose fragment shading had already completed before processing of the render output was suspended (e.g. as indicated by the suspend operation status information, e.g. where the suspend operation status information indicates that all of the sets of fragments generated from a primitive have completed their shading), these do not need to be processed again and in an embodiment the graphics processor is operable to fast-forward through these primitives without repeating their processing in the graphics processing pipeline. In an embodiment this is done by fast-forwarding to a position in the sequence of primitives based on the position of a suitable "base" primitive indicating the last primitive whose processing was completed (as discussed above).

There may also be certain special case ("global") primitives, e.g. that persist across different draw calls, such as primitives setting up pipeline state, draw call update, scissor box, etc. These primitives should be and in an embodiment are always processed again when processing is resumed, e.g. even if they lie ahead of the base primitive. These primitives will typically be encoded in the primitive lists such that can easily be identified. The graphics processor can thus identify these primitives and issue them into the graphics processing pipeline accordingly.

As mentioned above, the processing in respect of the sets of graphics fragments is in an embodiment stopped by suspending the execution of a respective fragment shader program for the set of graphics fragments. In that case, when a set of graphics fragments for which the processing was suspended arrives (again) at the rendering circuit when processing is resumed, the execution of the respective fragment shader program for the set of fragments is in an embodiment then also resumed.

In an embodiment, this is done by, for a set of fragments whose fragment shader program execution was suspended when the processing of the render output was suspended: issuing a group of one or more execution threads to the programmable execution unit to execute the fragment shader program for the set of fragments; loading from memory into registers associated with threads of the issued thread group a set of register content for the fragment shader program that was written out to memory when execution of the fragment shader program was suspended; loading from memory a set of fragment shader program state information for the fragment shader program including at least an indication of the last instruction in the fragment shader program that was executed for the thread group when processing of the fragment shader program was suspended; and after the register content and the fragment shader program state data has been loaded: resuming execution of the shader program for the issued thread group after the indicated last instruction in the shader program that was executed for the thread group; and using the loaded content of the registers for the threads of the issued thread group when executing the shader program for the issued thread group.

In an embodiment, the method also comprises graphics processor loading back in the rendered fragment data generated from the processing of the graphics primitives in the sequence of graphics primitives for the render output that was completed at the point at which the processing of the render output was suspended, together with any other data that was written out during the suspend operation and that may be required to resume processing.

It is believed that the resume operation described above is novel and advantageous in its own right.

A further embodiment of the technology described herein comprises a method of operating a graphics processor, wherein the graphics processor executes a graphics processing pipeline that is operable to process graphics primitives to generate a render output, the graphics processing pipeline comprising, in sequence:
  a first section in which graphics primitives are processed strictly in the order in which they were initially issued into the graphics processing pipeline;
  a second section including one or more graphics processing circuits that operate on graphics primitives input to the second section of the graphics processing pipeline from the first section to generate from graphics primitives input to the second section respective sets of one or more graphics fragments to be rendered for the render output, wherein primitives in the second section of the graphics processing pipeline may be processed out of the order in which they were initially issued into the graphics processing pipeline; and
  a rendering circuit for rendering respective sets of one or more graphics fragments received from the second section of the graphics processing pipeline;
the method comprising:
in response to a command to resume processing of a render output that was previously suspended:
  the graphics processing loading in for a sequence of primitives that was being processed for the render output when the processing was suspended a set of suspend operation status information indicating for which primitives in the sequence of primitives the processing was previously suspended;
  determining based on the set of suspend operation status information a section of primitives in respect of which the processing was previously suspended;
  issuing the primitives for which it is determined that the processing was previously suspended into the graphics processing pipeline and repeating at least some of the processing for the primitives in the graphics processing pipeline to generate from the primitives respective sets of one or more graphics fragments for rendering; and
  passing the generated sets of one or more graphics fragments to the rendering circuit for rendering to continue generating the render output.

Another embodiment of the technology described herein comprises a graphics processor, wherein the graphics processor comprises a plurality of processing circuits configured to execute a graphics processing pipeline that is operable to process graphics primitives to generate a render output, the graphics processing pipeline comprising, in sequence:
  a first section in which graphics primitives are processed strictly in the order in which they were initially issued into the graphics processing pipeline;
  a second section including one or more graphics processing circuits that operate on graphics primitives input to the second section of the graphics processing pipeline from the first section to generate from each of the graphics primitives input to the second section a respective set of one or more graphics fragments to be rendered for the render output, wherein primitives in the second section of the graphics processing pipeline may be processed out of the order in which they were initially issued into the graphics processing pipeline;
  a rendering circuit for rendering respective sets of one or more graphics fragments received from the second section of the graphics processing pipeline; and
  a control circuit that is configured to operate the graphics processor such that:
    in response to a command to resume processing of a render output being generated by the graphics processor:
    the control circuit causes a read-in circuit of the graphics processor to load in for a sequence of primitives that was being processed for the render output when the processing was suspended a set of suspend operation status information indicating for which primitives in the sequence of primitives the processing was previously stopped such that the graphics processing can determine based on the set of suspend operation status information a section of primitives in respect of which the processing was previously stopped;
    the control circuit then issuing the primitives for which it is determined that the processing was previously stopped into the graphics processing pipeline and repeating at least some of the processing for the primitives in the graphics processing pipeline to generate from the primitives respective sets of one or more graphics fragments for rendering to continue generating the render output.

As mentioned above, it is a benefit of technology described herein that when processing is resumed it is only necessary to repeat processing of some of the primitives for the first render output. In particular, any primitives whose processing had fully completed do not need to be processed again, and in an embodiment these are therefore not re-issued into the graphics processing pipeline. Any primitives for which the processing was only partially completed are re-issued into the graphics processing pipeline; however, the graphics processor is able to determine from the suspend operation status information whether, and how, to process the corresponding sets of fragments such that some or all of the fragment processing can be omitted or bypassed, where it is possible to do so, e.g. in order to provide a more efficient resume process. For example, the fragment shading may be omitted where this has already competed. Furthermore, the early depth/stencil testing (where this is performed) may also be omitted for any and all fragments in respect of which the processing was either suspended or had already completed.

As will be appreciated from the above, the technology described herein is in an embodiment implemented in a system comprising a memory system and a graphics processing unit (GPU) (a graphics processor). Data for a render output (e.g. image to be displayed) is in an embodiment stored in a memory of the memory system. The GPU is in an embodiment arranged to read required data from the memory system for generating the render output (e.g. in the manner described above). The render output, once generated in this way, is then in an embodiment displayed, e.g. on a display such as a screen or the like.

In an embodiment, the graphics processing system includes a host processor that executes applications that can require graphics processing by the graphics processing unit (processor). The system in an embodiment further includes appropriate storage (e.g. memory), caches, etc., as described above.

The graphics processing system and/or processor in an embodiment also comprises, and/or is in communication with, one or more memories and/or memory devices that store the data described herein, and/or that store software for performing the processes described herein. The graphics processing system and/or processor may also be in communication with a host microprocessor, and/or with a display for displaying images based on the data generated by the graphics processor (processing pipeline).

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, unless otherwise specified, the functions of the technology described herein can be implemented in hardware or software, as desired. Thus, for example, the various functional elements and stages of the technology described herein may comprise a suitable processor or processors, controller or controllers, functional units, circuits/circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

Furthermore, unless otherwise specified, any one or more or all of the processing stages of the technology described herein may be embodied as processing stage circuits/circuitry, e.g., in the form of one or more fixed-function units (hardware) (processing circuits/circuitry), and/or in the form of programmable processing circuits/circuitry that can be programmed to perform the desired operation. Equally, any one or more of the processing stages and processing stage circuits/circuitry of the technology described herein may be provided as a separate circuit element to any one or more of the other processing stages or processing stage circuits/circuitry, and/or any one or more or all of the processing stages and processing stage circuits/circuitry may be at least partially formed of shared processing circuits/circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

FIG. 1 shows a typical computer graphics processing system. An application 2, such as a game, executing on a host processor (CPU) 1 will require graphics processing operations to be performed by an associated graphics processing unit (GPU) (graphics processor) 3 that executes a graphics processing pipeline. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

As shown in FIG. 1, the graphics processing system will also include an appropriate memory system 5 for use by the host CPU 1 and graphics processor 3.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, their associated data values are then stored in memory, ready for output, e.g. for display.

In the present embodiments, graphics processing is carried out in a pipelined fashion, with one or more pipeline stages operating on the data to generate the final render output, e.g. frame that is displayed.

Figure 2:
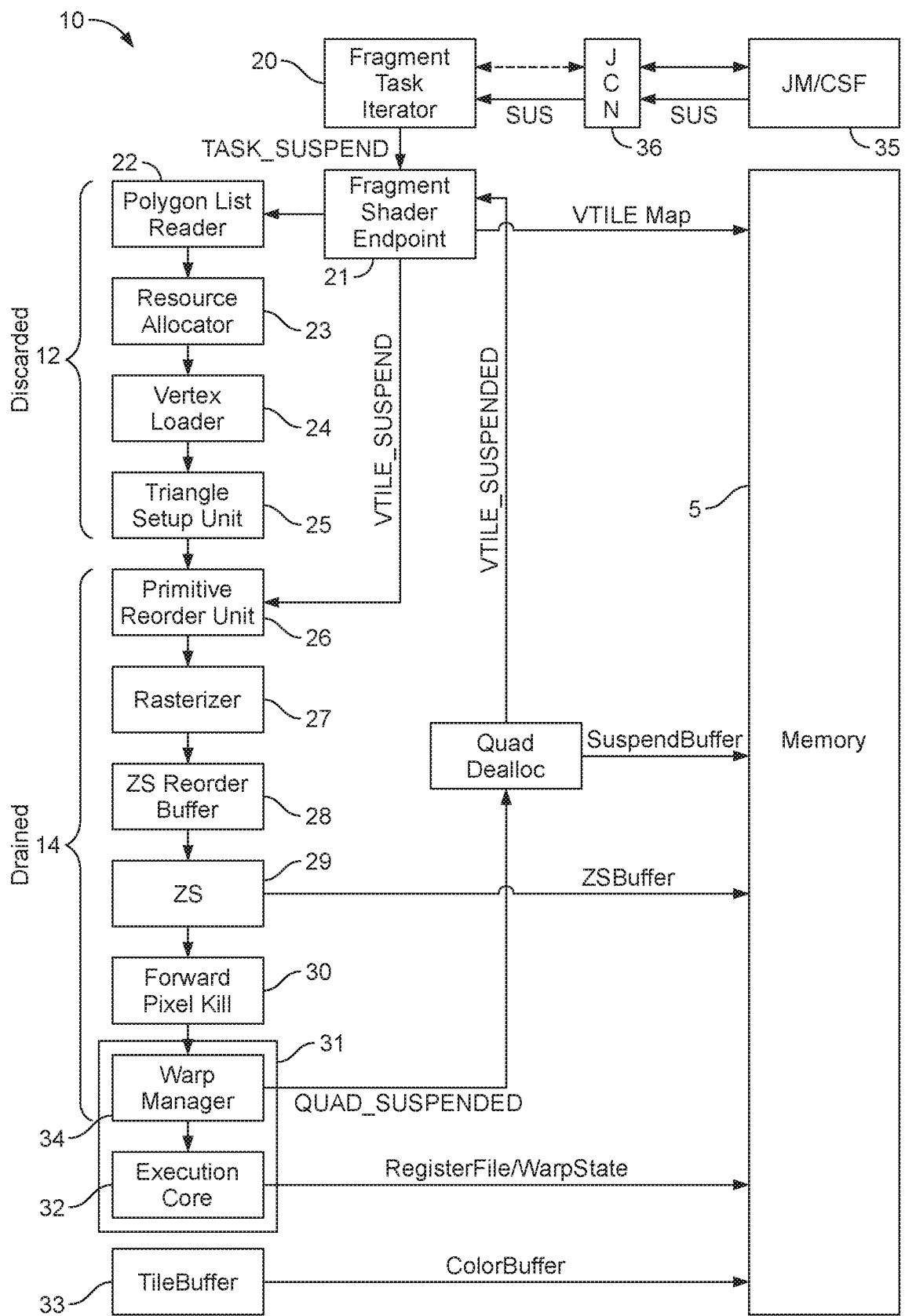
FIG. 2 shows an exemplary graphics processing pipeline within which the technology described herein may be implemented in the event where a command to suspend processing of a render output is received.

FIG. 2 shows an exemplary graphics processing pipeline 10 that may be executed by a graphics processor. The graphics processing pipeline 10 shown in FIG. 2 is a tile-based system, and will thus produce tiles of a render output data array, such as an output frame to be generated. (The technology described herein is however also applicable to other systems, such as immediate mode rendering systems.) The output data array may typically be an output frame intended for display on a display device, such as a screen or printer, but may also, for example, comprise a "render to texture" output of the graphics processor, or other suitable arrangement.

FIG. 2 shows the main elements and pipeline stages of the graphics processing pipeline according to the present embodiments. As will be appreciated by those skilled in the art, there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. Equally, some of the elements depicted in FIG. 2 need not be provided, and FIG. 2 merely shows one example of a graphics processing pipeline 10. It will also be appreciated that each of the stages, elements and units, etc., of the graphics processing pipeline as shown in FIG. 2 may be implemented as desired and will accordingly comprise, e.g., appropriate circuits and/or processing logic, etc., for performing the necessary operation and functions.

The graphics processing pipeline as illustrated in FIG. 2 will be executed on and implemented by an appropriate graphics processing unit (GPU) (graphics processor) that includes the necessary functional units, processing circuits, etc., operable to execute the graphics processing pipeline stages.

In order to control a graphics processor (graphics processing unit) that is implementing a graphics processing pipeline to perform the desired graphics processing operations, the graphics processor will typically receive commands and data from a driver, e.g. executing on a host processor, that indicates to the graphics processor the operations that it is to carry out and the data to be used for those operations.

The graphics processor may include a tiler (not shown) for preparing primitive lists. The tiler in effect determines which primitives need to be processed for different regions of the render output. In the present embodiments, these regions may, e.g., represent a tile into which the overall render output has been divided into for processing purposes, or a set of multiple such tiles. To do this, the tiler compares the location of each primitive to be processed with the positions of the regions, and adds the primitive to a respective primitive list for each region that it determines the primitive could (potentially) fall within. Any suitable and desired technique for sorting and binning primitives into tile lists, such as exact binning, or bounding box binning or anything in between, can be used for the tiling process.

Once the tiler has completed the preparation of the primitive lists (lists of primitives to be processed for each region), then each tile can be rendered with reference to its associated primitive list(s).

To do this, each tile is processed by the graphics processing pipeline stages shown in FIG. 2.

A fragment task iterator 20 is thus provided that schedules processing work to the graphics processing pipeline 10.

The fragment task iterator 20 may thus schedule the graphics processing pipeline to generate a first render output, which may, e.g. be a frame to display. In the present embodiments, wherein the graphics processing pipeline 10 is a tile-based system, in which the render output has been divided into a plurality of rendering tiles, the graphics processing pipeline 10 iterates over the set of tiles for the first render output, rendering each tile in turn.

For a given tile that is being processed, a primitive list reader (or 'polygon list reader') 22 thus identifies a sequence of primitives to be processed for that tile (the primitives that are listed in the primitive list(s) for that tile), and an ordered sequence of primitives for the tile is then issued into the graphics processing pipeline 10 for processing.

A resource allocator 23 then configures and manages the allocation of memory space for the depth (Z), colour, etc., buffers for the render output. These buffers may, e.g., be provided as part of RAM that is located on (local to) the graphics processing pipeline (chip).

A vertex loader 24 then loads in the vertices for the primitives, which are then passed into a primitive set-up unit (or 'triangle set-up unit') 25 that operates to determine, from the vertices for the primitives, edge information representing the primitive edges.

Up to this point, the primitives are processed strictly in the order in which they were initially issued into the graphics processing pipeline 10. Furthermore, the processing so far has not yet produced any observable effects for the render output (such that the processing could be repeated from the beginning without risking introducing any artefacts in the render output by repeating the processing).

These stages thus define a 'first section' 12 of the graphics processing pipeline 10 in which it can be guaranteed that the primitives are still in their initial order, and have not yet produced any observable effects for the render output.

Before the primitives are passed to the rasteriser 27 the primitives may desirably be re-ordered, e.g. to improve the rasterisation efficiency, hidden surface removal, etc. Thus, the graphics processing pipeline 10 includes a primitive re-order unit 26 containing a buffer of primitives that may be subject to re-ordering.

Beyond this point, it can therefore no longer be guaranteed that the primitives are still in their initial specified order. Further, the rasterisation may start to produce observable effects for the render output.

The stages of the graphics processing pipeline following the primitive re-ordering thus define a 'second section' 14 of the graphics processing pipeline in which it can no longer be ensured that the primitives are in order, and in which the processing may have produced observable effects for the render output (such that repeating this processing may start to introduce artefacts into the render output).

The edge information for the re-ordered primitives is then passed to the rasteriser 27, which rasterises the primitives into a set of one or more sampling points and generates from the primitives individual graphics fragments having appropriate positions (representing appropriate sampling positions) for rendering the primitive.

The fragments generated by the rasteriser 27 are then sent onwards to the rest of the pipeline for processing.

For instance, in the present embodiments, the fragments generated by the rasteriser 27 are subject to (early) depth (Z)/stencil testing 29, to see if any fragments can be discarded (culled) at this stage. To do this, the Z/stencil testing stage 29 compares the depth values of (associated with) fragments issuing from the rasteriser 27 with the depth values of fragments that have already been rendered (these depth values are stored in a depth (Z) buffer that is part of the tile buffer 33) to determine whether the new fragments will be occluded by fragments that have already been rendered (or not). At the same time, an early stencil test is carried out.

To facilitate this, the fragments may be subject to further re-ordering in a ZS re-order buffer 28 upstream of the Z/stencil testing stage 29.

Fragments that pass the fragment early Z and stencil test stage 29 may then be subject to further culling operations, such as a 'forward pixel kill' test 30, e.g. as described in United States Patent Application Publication No. 2019/0088009 (Arm Limited), before the remaining fragments are then passed to a fragment shading stage for rendering.

The fragment shading stage performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data.

In the present embodiment, the fragment shading stage is in the form of a shader pipeline (a programmable fragment shader), and thus is implemented by means of an appropriate shader (processing) core 31.

Thus, as shown in FIG. 2, in the present embodiment, the fragment shading stage (shader core) 31 includes a programmable execution unit (engine) 32 operable to execute fragment shader programs for respective execution threads (where each thread corresponds to one work item, e.g. an individual fragment, for the render output being generated) to perform the required fragment shading operations to thereby generate rendered fragment data. The execution unit 32 can operate in any suitable and desired manner in this regard and comprise any suitable and desired processing circuits, etc.

In the present embodiments, the execution threads may be arranged into "groups" or "bundles" of threads, where the threads of one group are run in lockstep, one instruction at a time, i.e. each thread in the group executes the same single instruction before moving onto the next instruction. In this way, it is possible to share instruction fetch and scheduling resources between all the threads in a group. Such thread groups may also be referred to as "sub-groups", "warps" and "wavefronts". For convenience the term thread group will be used herein, but this is intended to encompass all equivalent terms and arrangements, unless otherwise indicated.

FIG. 2 accordingly also shows a thread group controller, in the form of a warp manager 34, that is configured to control the allocation of work items (e.g. fragments) to respective thread groups for the fragment shading operations to be performed by the execution unit 32, and the issuing of thread groups to the execution unit 32 for the execution of the fragment shading programs by respective thread groups.

As shown in FIG. 2, the fragment shading stage (shader core) 31 is also in communication with the memory 5.

Once the fragment shading is complete, the output rendered (shaded) fragment data is written to the tile buffer 33 from where it can, for example, be output to a frame buffer for display. The depth value for an output fragment is also written appropriately to a Z-buffer within the tile buffer 33. (The tile buffer stores colour and depth buffers that store an appropriate colour, etc., or Z-value, respectively, for each sampling point that the buffers represent (in essence for each sampling point of a rendering tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

As mentioned above, the tile buffer 33 is normally provided as part of RAM that is located on (local to) the graphics processing pipeline (chip).

Once a tile for the render output has been processed, the data from the tile buffer(s) may thus be written back to an external memory output buffer, such as a frame buffer of a display device (not shown). (The display device could comprise, e.g., a display comprising an array of pixels, such as a computer monitor or a printer.)

The next tile is then processed, and so on, until sufficient tiles have been processed to generate the entire render output (e.g. frame (image) to be displayed). The process is then repeated for the next render output (e.g. frame) and so on.

The present embodiments, however, relate to the situation where the generation of a first render output is suspended before it can complete, e.g. to generate a second, different render output.

For example, this may be the case when the graphics processor is being shared between multiple concurrently running applications such that the graphics processor may need to repeatedly switch between generating different render outputs for the respective, different applications.

In this case, as shown in FIG. 2, when it is desired to switch between render outputs, the fragment task iterator 20 issues a command ("TASK SUSPEND") to suspend processing of the current render output. This may, e.g., be in response to a command to suspend processing the current render output received from the driver that is controlling the graphics processor to generate that render output.

Figure 3:
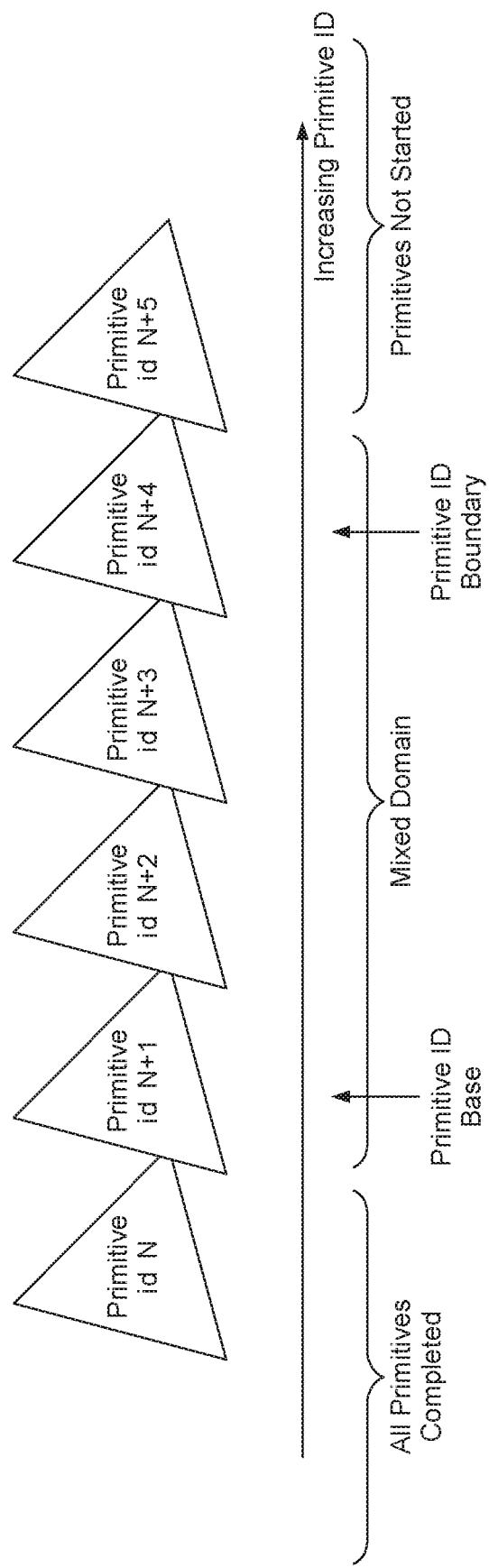
FIG. 3 illustrates a sequence of primitives being processed in a graphics processing pipeline.

FIG. 3 illustrates a sequence of primitives in the graphics processing pipeline at the point at which the TASK SUSPEND command is received. As shown in FIG. 3 it will be appreciated that different primitives in the sequence of primitives will have reached different stages in the graphics processing pipeline. In particular within a sequence of primitives that are currently being processed for a render output it is possible to determine the identity of a boundary primitive behind which the fragment processing has not yet started and for which the processing has not yet produced any observable effects for the render output (these are the primitives in the first section of the graphics processing pipeline, and any primitives not yet issued into the graphics processing pipeline).

It is also possible to determine the identity of a base primitive ahead of which all of the fragment processing has completed.

The boundary and base primitive thus identify an intermediate section of primitives for which the processing has a mixed state of complete and incomplete primitives. This section requires explicit action to suspend, and it is thus the suspending of these primitives that the present embodiments particularly relate to.

Figure 4:
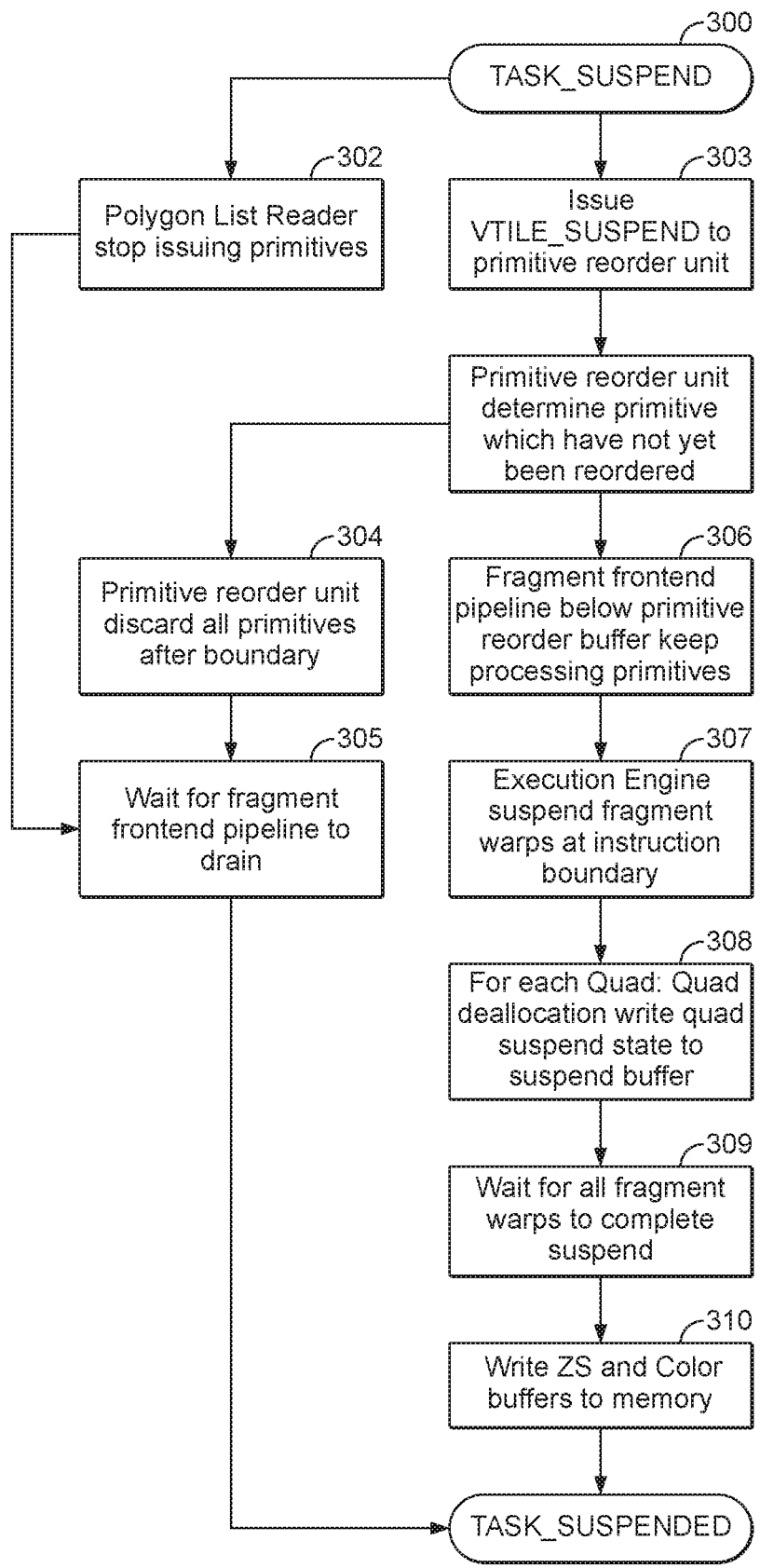
FIG. 4 is a flow chart showing the overall operation of the graphics processor when a command to suspend processing of the current render output is issued.

The suspend operation according to the present embodiments is illustrated schematically in FIG. 4.

Thus, in response to the fragment task iterator 20 issuing a command ("TASK SUSPEND") to suspend processing of the current render output (which in the present embodiments represents a "metatile", the metatile covering an area of the overall render output, e.g., frame to be displayed, with the size of the metatile specified by the application requiring the graphics processing, and with the metatile being subdivided at the graphics processor into a number of smaller area rendering tiles (also referred to as "virtual tiles")) (step 300) a controller for the fragment shading operation, the fragment shader endpoint 21 stops issuing any new (virtual/rendering) tiles to the graphics processing pipeline 10 for rendering, and the primitive list reader 22 accordingly stops issuing any new primitives (step 302).

At the same time, the suspend operation is signalled to the primitive re-order unit 26 (step 303), which then determines a suitable suspend operation boundary primitive at which to suspend the current sequence of primitives. In particular, in the present embodiments, the selected boundary primitive is the last primitive in the primitive re-order unit 26 that is guaranteed to still be in order, and for which the processing thus far has not produce any observable effects for the render output. The primitive re-order unit 26 then responds with a primitive identifier ("primitive_id") identifying the position of the selected boundary primitive within the sequence of primitives for the rendering tile that is currently being processed, as well as a tile identifier ("VTILE_id") identifying the tile in question. The tile buffer 33 is then notified which tile is to be suspended.

The primitive re-order unit 26 can then (and does) discard all primitives in the sequence of primitives for the tile that are behind the selected boundary primitive (i.e. that are earlier in the pipeline than the selected boundary primitive) (step 304). The primitive list reader then waits for the fragment frontend pipeline to drain (step 305).

The processing of any primitives in the sequence that are ahead of the selected boundary primitive, and that are therefore further ahead in the graphics processing pipeline, is continued (step 306).

However, after the primitives are processed into respective sets of one or more graphics fragments (e.g. quads), and corresponding groups of execution threads have been allocated in the execution core 32 for executing a fragment shader program for the set of graphics fragments (quad), rather than completing the fragment shading for the set of fragments, the execution core 32 suspends the execution of the fragment shader program for the set of graphics fragments at an appropriate instruction boundary (step 307).

For each set of graphics fragments for which the execution of a fragment shader program is suspended in this way, the respective warp is then deallocated and a set of suspend operation status information indicating that the fragment shader program was suspended (QUAD_SUSPENDED') is then written out to a suitable suspend buffer (step 308).

Suspend operation status information is written out for all of the sets of fragments for the render output that was suspended. For example, a suspend operation status is written out in respect of each set of fragments associated with a primitive. For sets of fragments that have completed the shading a QUAD_DONE status can be written out. Correspondingly, for primitives that had not yet entered the graphics processing pipeline, or which were discarded in the first section of the graphics processing pipeline, the sets of fragments have not yet started their processing and so a NOT_STARTED status can be automatically assigned for all sets of fragments associated with such primitives (or, equivalently the suspend operation status may be left blank for sets of fragments associated with such primitives).

Correspondingly, suspend operation status information is written out for the metatiles and the suspend operation status data ('VTILE_NOT_STARTED', 'VTILE_SUSPENDED', 'VTILE_DONE') for each of the metatiles for the overall render output is then written out as a bitmap.

Once all of the primitives have been discarded/suspended in the appropriate fashion (step 309), the current (updated) rendered fragment data (e.g. colour, depth, etc., values) for the tile that was suspended is then written out to the suspend buffer, together with the register content associated with the suspended fragment shader programs (and any other data that may be required for resuming processing) (step 310).

Figure 5:
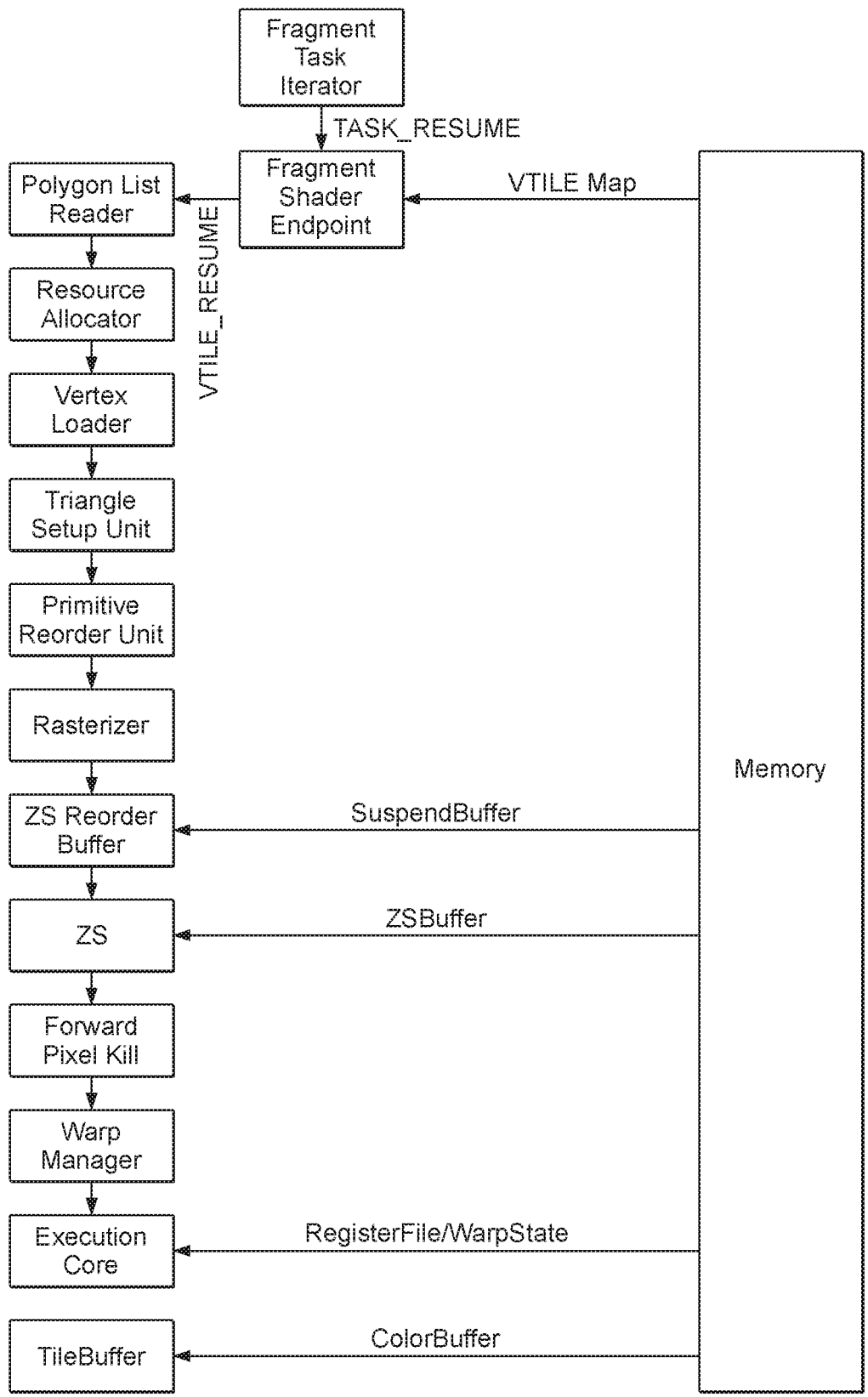
FIG. 5 shows the data flow within the graphics processing pipeline of FIG. 2 in the event where a command to resume processing of a previously suspended render output is received.
Figure 6:
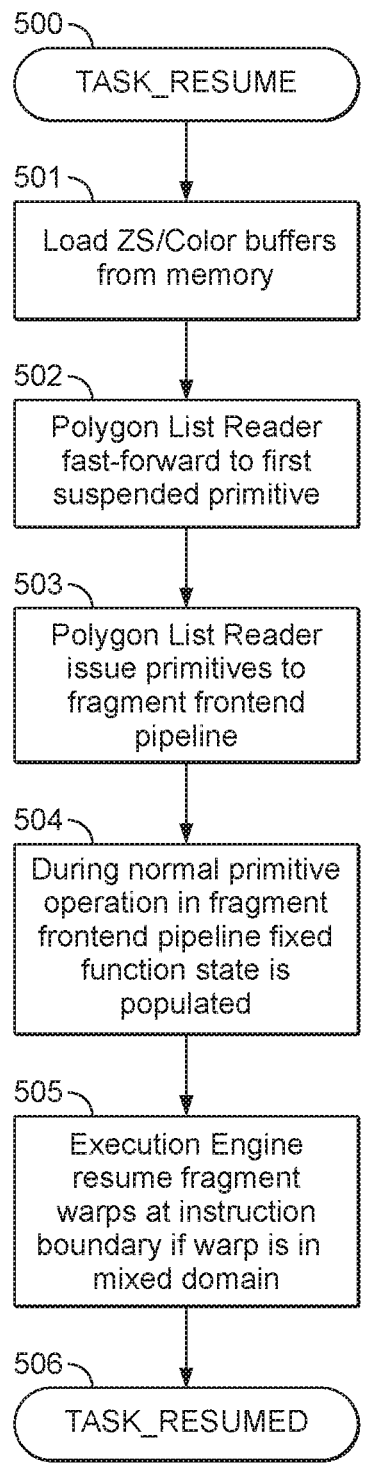
FIG. 6 is a flow chart showing the overall operation of the graphics processor when the command to resume processing of the render output is issued.

FIG. 5 shows the data flow during the corresponding resume operation. The resume operation will now be described with respect to FIG. 6.

Thus, in response to the fragment task iterator 20 issuing a command ("TASK_RESUME") to resume processing of a render output that was previously suspended in the manner described above (step 500), the fragment shader endpoint can then read the bitmap of suspend operation status information to determine which metatiles need to be resumed. In particular, the fragment shader endpoint can determine from the bitmap of suspend operation status information which of the metatiles had their processing suspended (those having status 'VTILE_SUSPENDED').

For a metatile that needs to be resumed, the graphics processor then loads in the tile (colour, depth, etc.) buffers from the suspend buffer in memory (step 501). The primitive list reader then fast-forwards through the sequence(s) of primitives for the metatile to the first primitive in the sequence of primitives for the metatile that was suspended (i.e. based on the position of the base primitive) (step 502) and issues primitives from that primitive onwards to the fragment frontend pipeline (step 503). (It will be appreciated that any special 'global' primitives, for example, scissor commands, encountered during this fast-forward do still need to be passed into the graphics processing pipeline and this is therefore done. Such primitives can be identified within the primitive lists.)

The primitives are then executed again in the graphics processing pipeline in order to populate the intermediate fragment state (that was previously drained during the suspend operation) (step 504).

The primitives thus pass again through the second section of the graphics processing pipeline and are rasterised into sets of graphics fragments, etc.

During this repeated processing the ZS re-order buffer 28 should read the suspend operation status information to identify the status of the sets of fragments. A set of fragments which has already been shaded ('QUAD_DONE') has already completed all shading. There is thus no need to repeat the ZS testing or the fragment shading and the set of fragments should therefore go straight to quad deallocation when it arrives at the rendering circuit.

Any sets of fragments whose processing was previously suspended ('QUAD_SUSPENDED') should also bypass the ZS testing to avoid potentially corrupting the depth buffer (since the ZS testing was already performed during the suspend operation).

A set of fragments which has not yet started shading should be processed in full, as normal.

When a set of fragments that was previously suspended arrives at the rendering circuit, the rendering circuit should then run a resume micro-coded sequence to reload its register file content, etc., as will be explained below. Thus, the primitives are rasterised again into respective sets of graphics fragments (quads), and a group of execution threads is then generated for executing respective fragment shader programs for the sets of graphics fragments. If a fragment shader program for the set of graphics fragments was previously suspended, the execution core is thus able to resume execution of the fragment shader programs for the set of graphics fragments (step 505), e.g. by re-loading the relevant register content, etc., to resume generation of the render output (step 506).

The manner in which the execution of the fragment shader programs are suspended/resumed in the present embodiment will now be described in more detail.

Figure 7:
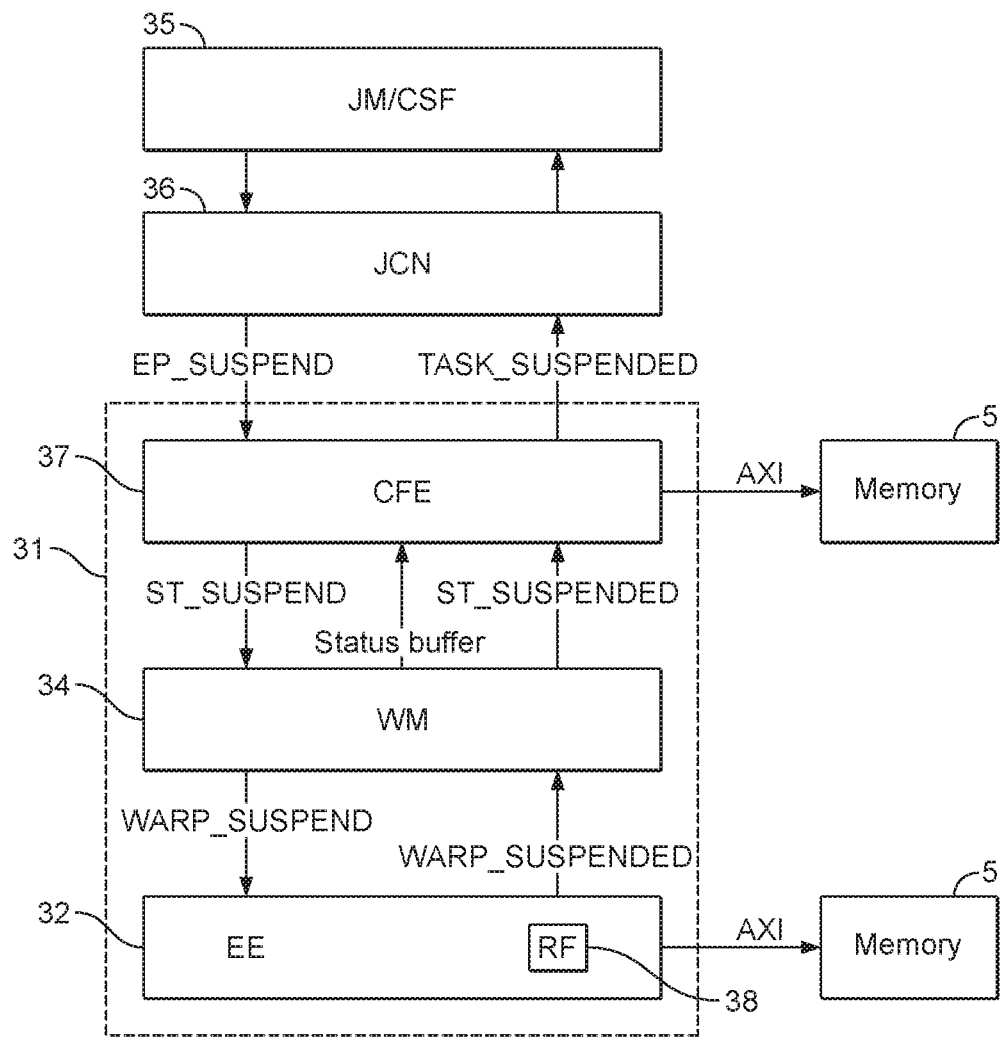
FIGS. 7 and 8 show schematically a shader core of a graphics processor in an embodiment of the technology described herein.
Figure 8:
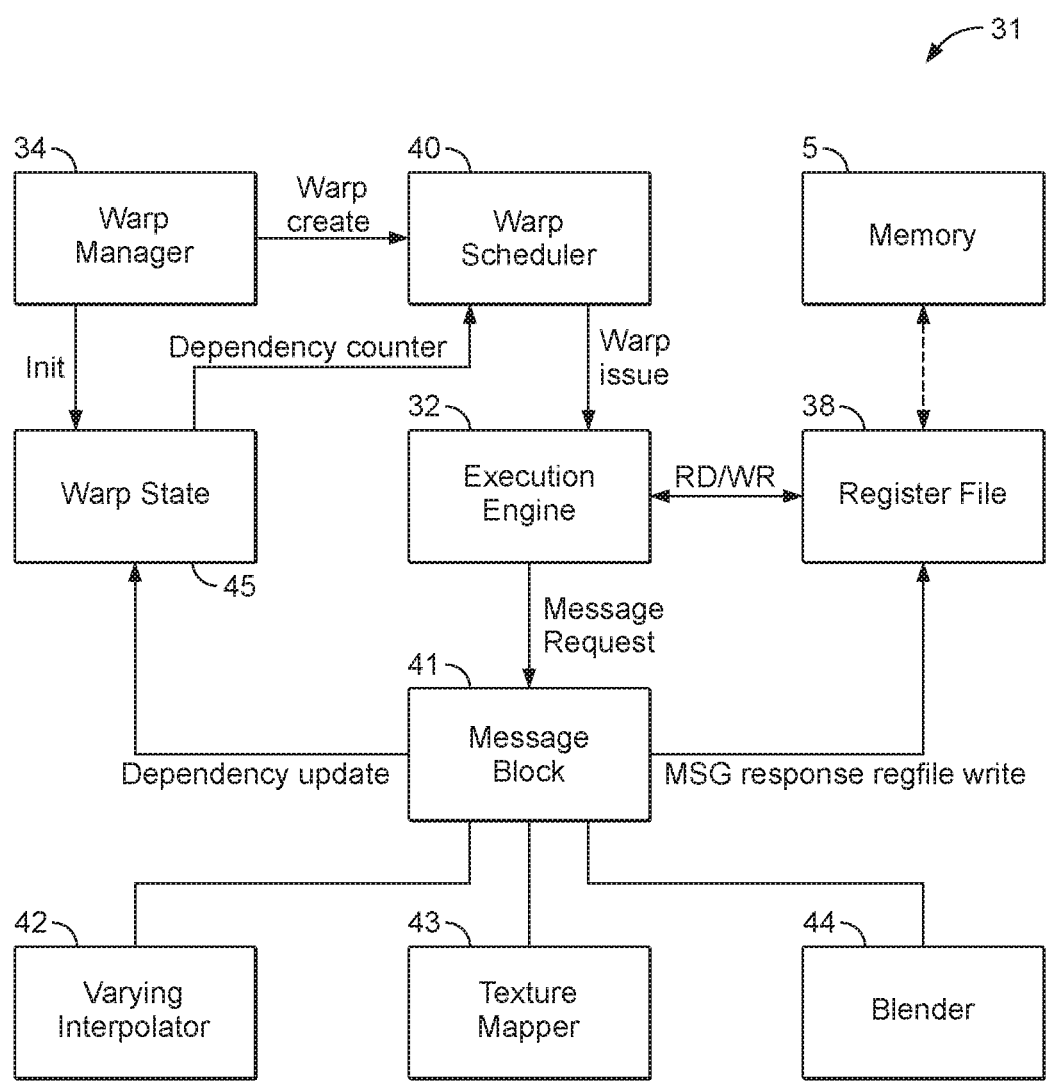

FIGS. 7 and 8 show the shader core (fragment shading stage) 31 in more detail. These Figures show in particular the operational units of the shader core of the graphics processor that are relevant to the suspending of thread groups that are executing a shader program in the present embodiment. (As will be appreciated by those skilled in the art, the fragment shading stage (shader core) 31 may include other elements, components, etc., not shown in FIGS. 7 and 8. FIGS. 7 and 8 simply illustrate the elements and components, etc., of the shader core that are relevant to the operation of the present embodiments.)

FIG. 7 shows the interface between the job manager 35 and the fragment shader core (stage) 31, together with the various messages, etc., that are provided and exchanged when fragment shader execution is suspended for a render output in an embodiment of the technology described herein (this will be discussed in more detail below).

Thus, as shown in FIG. 7, the fragment shader core 31 includes, in addition to the thread group controller (warp manager) 34, and the programmable execution unit (execution engine) 32, an appropriate shader core "frontend" 37.

The shader core frontend 37 is operable to, inter alia, subdivide fragment shading tasks received from a job manager 35 (via a job control network 36) into respective sub-tasks, corresponding to one or more sets of fragments received from the rasteriser, e.g. associated with a primitive. The core frontend 37 will then send the relevant sub-tasks to the thread group controller (warp manager) 34, which thread group controller will then operate to issue respective thread groups (warps) for each sub-task to the programmable execution unit (execution engine) 32 of the shader core, for the programmable execution unit 32 to then execute the appropriate shader program for the thread groups (warps).

As shown in FIG. 7, the programmable execution unit 32 also has an appropriate communication path (e.g. bus or interconnect) to the memory 5, as does the core frontend 37. FIG. 7 also shows the registers (register file) 38 that are available to and used by the programmable execution unit 32 when executing a shader program for a group of threads.

FIG. 8 shows further elements of the shader core 31 in more detail.

As shown in FIG. 8 in operation of the fragment shader core 31, the thread group controller (warp manager) 34 will create (spawn) thread groups (warps), and provide those thread groups to a thread group (warp) scheduler 40, which will then issue the thread groups (warps) appropriately to the programmable execution unit 32 for shader program execution.

The warp manager 34 will also set up appropriate state data 45 for each thread group (warp) that it creates.

The programmable execution unit 32 will then execute the required shader program for the (execution threads of the) thread groups (warps) that it receives.

As shown in FIG. 8, the programmable execution unit 32 when executing a shader program for a thread group will, inter alia, read and write to appropriate registers of a register file 38 allocated to the threads of the thread group that is executing the shader program, and may also send messages requesting processing by "slave" hardware accelerators, such as a varying interpolator 42, a texture mapper 43 and a blender 44, to a message block (circuit) 41 (which in response to requests for slave accelerator processing from the programmable execution unit 32 will send appropriate messages to the relevant accelerator to trigger that processing (as shown in FIG. 8).

The message block 41 is also operable to write the responses returned by the accelerators to the appropriate registers in the register file 38, and to update appropriate dependencies (e.g. that track when shader program execution for a thread group is awaiting a response from a slave accelerator) in the warp state record 45. The thread group (warp) state 45 is also provided to the thread group (warp) scheduler 40 for use when issuing thread groups (warps) to the programmable execution unit 32.

In the present embodiment the execution of a fragment shader program can be suspended at an arbitrary instruction boundary such that the execution can then be resumed from the next instruction. For any primitives for which fragment shader programs are currently executing when the suspend command is received, the respective fragment shader programs are thus suspended in the manner described below.

The suspending of any primitives currently in the second section is in the present embodiment performed in the same way, i.e. by allocating respective thread groups (warps) for executing a respective fragment shader program for the respective sets of fragments generated from the continued processing in the second section, and then suspending the execution of the fragment shader program for the thread group (warp).

Figures 9, 10:
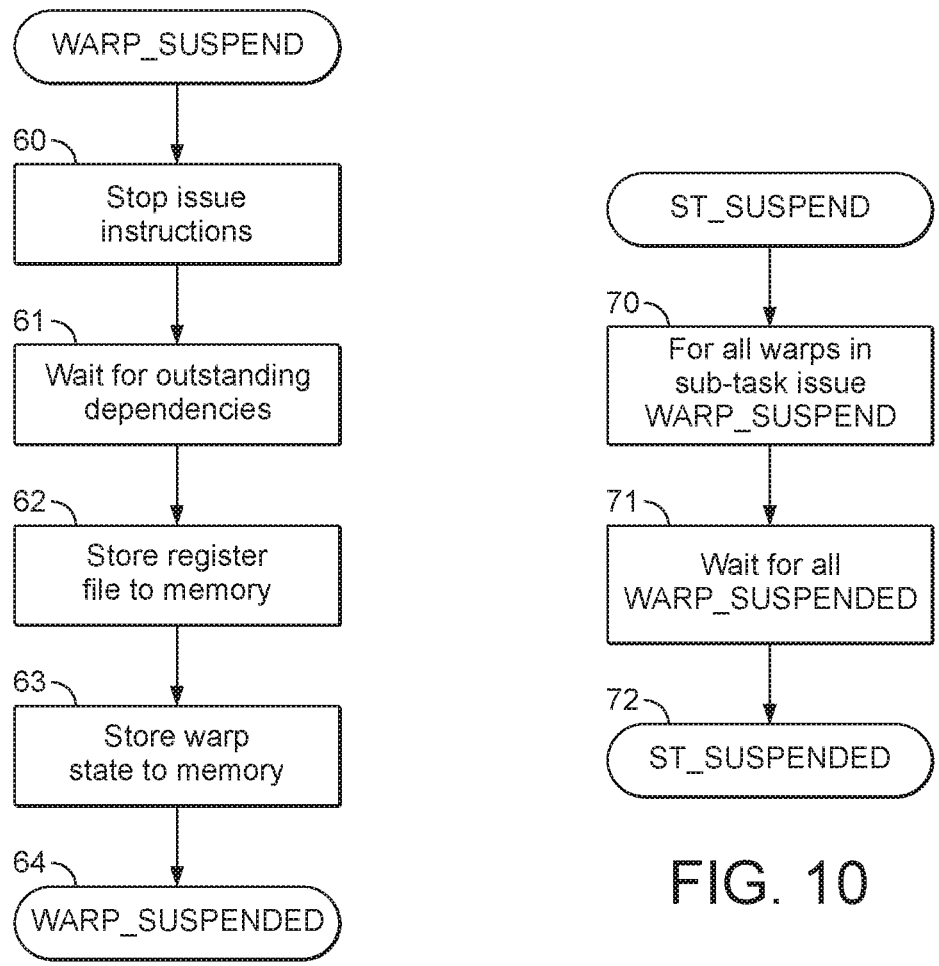
FIGS. 9 and 10 show a mechanism for the suspending execution of a fragment shader program in an embodiment of the technology described herein.
Figure 11:
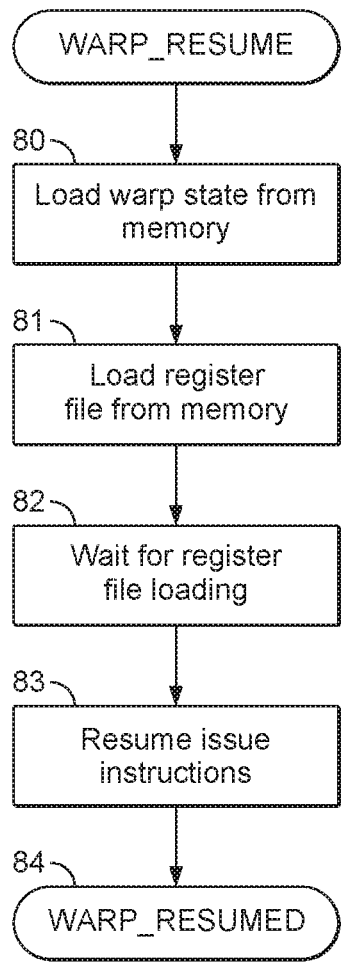
FIGS. 11 and 12 show the resuming execution of a fragment shader program in an embodiment of the technology described herein.
Figure 12:
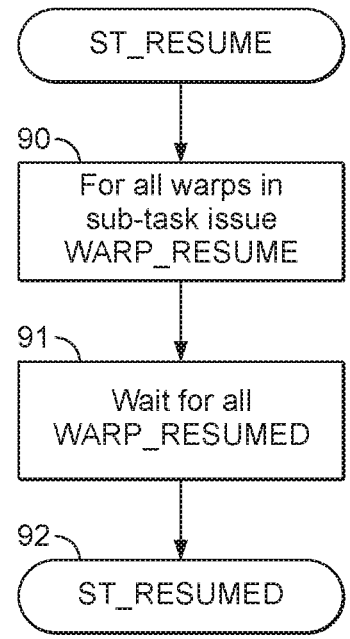

This suspend mode of operation is shown in FIG. 9. As shown in FIG. 9, for a thread group (warp) whose shader program execution is to be suspended, the warp scheduler 40 first stops the issuing of further instructions for execution for the thread group (warp) in question (step 60). Thus the thread group will complete its execution (where and as appropriate) of any already issued shader program instructions, but no further instructions will be issued for execution by the thread group.

The suspend operation will then wait for all outstanding transactions that affect the content of the registers associated with the threads of the group of one or more execution threads (e.g., including memory transactions such as reads and writes to and from the register file for the threads of the thread group, as well as any slave unit (e.g. varying, texture, blend) transactions) to complete (step 61).

(The suspend operation only waits for outstanding such transactions that affect the content of the registers associated with the threads of the group of one or more execution threads to be completed, it does not wait for any other dependencies to be met.)

The completion of the outstanding transactions (of the outstanding memory dependencies) can be tracked and checked in any suitable and desired manner, e.g., by using appropriate dependency counters (slots) to keep track of outstanding dependencies for the threads of the thread group.

Once all the outstanding transactions have been completed (and any already issued instructions have been executed), then, as shown in FIG. 9, the register file content for the thread group (step 62), and the current thread group (warp) state (step 63), are stored to memory.

The thread group state information that is stored to memory comprises all the state that is needed to subsequently resume execution of all the shader program at the suspended instruction for the thread group (warp) in question. In the present embodiments, the thread group state information includes a set of state information for each thread in the thread group. In the present embodiments, where fragment suspend is supported, the stored thread and thread group state includes the program counter (PC), Call Stack depth, discard state, terminate state, lane active state, etc., for the threads of the thread group (warp).

In the present embodiments, the register file content and the warp state are stored to memory by executing a thread group "suspend routine", which in the present embodiments is run as a micro-coded sequence in the message block 41 of the shader core 31.

An exemplary instruction sequence for this suspend routine is shown below:

STORE.i128.pack.estream.slot0 r0:r3 suspend_buffer_base
STORE.i128.pack.estream.slot0 r4:r7 suspend_buffer_base+16
STORE.i128.pack.estream.slot0 r8:r11 suspend_buffer_base+32
STORE.i128.pack.estream.slot0 r12:r15 suspend_buffer_base+48
STORE.i128.pack.estream.slot0 r16:r19 suspend_buffer_base+64
STORE.i128.pack.estream.slot0 r20:r23 suspend_buffer_base+80
STORE.i128.pack.estream.slot0 r24:r27 suspend_buffer_base+96
STORE.i128.pack.estream.slot0 r28:r31 suspend_buffer_base+112
STORE_STATE.pack.estream.slot0.wait0 suspend_buffer_base+128

As can be seen, this instruction sequence comprises a sequence of STORE instructions that store the relevant register content (in this case assuming that there are 32 registers per thread, but such a sequence of instructions can correspondingly be used for any arbitrary register allocation to threads), together with a final "STORE_STATE" instruction which stores the required thread group (warp) state, at progressively increasing memory addresses in a "suspend buffer" in memory.

In this way, the up-to-date register content and warp state for the thread group are stored together in a "suspend buffer" for the thread group (warp) in memory.

As can be seen from the instruction sequence above, the suspend routine includes an appropriate "wait" dependency (wait 0) to monitor for the completion of the suspend routine.

When the suspend routine has completed (in this case, the dependency counter 0 (slot 0) has cleared), then an indication that the thread group has been successfully suspended (WARP_SUSPENDED) is sent to the warp manager 34 (step 64). (It would also be possible to allow for an error signal to be returned in the case that for some reason the suspend sequence failed.)

This operation is repeated for each thread group (warp) whose shader program execution is to be suspended. Thus there will be a sequence of thread group (warp) suspend buffers stored to the memory.

The above discusses the suspend operation for thread groups executing the shader program.

In order therefore to allow the shader program execution to be resumed for those thread groups that require it when generation of a suspended render output is resumed, in the present embodiments, the warp scheduler 40 returns to the warp manager 34 a thread group (warp) suspended state indication for each thread group (corresponding to a set of fragments) in the sub-task that is being suspended.

Thus, in the present embodiments, each thread group (warp) for the set of fragments in question returns a warp suspended state which indicates that the warp was already completed (WARP_DONE), that the warp was suspended (WARP_SUSPENDED), or that there was an error. Thus each warp (thread group) responds with a 2-bit warp suspend state indication.

In the present embodiments, the warp scheduler 40 is configured to send the warp suspended status to the warp manager 34 in the thread group (warp) issue order (age order). This helps to simplify the buffering and the amount of data that needs to be stored to keep track of which suspend indication relates to which thread group.

The warp manager 34 then stores the warp suspended state indications from the thread groups (warps) that it receives in a "sub-task" warp "suspend status" buffer (and in the thread group (warp) issue (age) order). The sub-task warp suspend status buffer thus contains one entry (indication) for each warp in the sub-task in a linear order at progressively increasing memory addresses in the issue (age) order of the warps for the sub-task.

In the present embodiments, in order to facilitate the resume operation the suspend status is tracked for the sets of fragments (quads) (rather than the thread groups (warps) per se). That is, rather than storing the suspend status on a per thread group basis (e.g. as a WARP_DONE or WARP_SUSPENDED status), a corresponding suspend status is stored for the sets of fragments. Thus, when suspending a thread group (warp), each set of fragments (quad) in the warp will get the same suspend status (i.e. QUAD_SUSPENDED or QUAD_DONE).

A primitive which covers an entire 32×32 pixel tile would have at most 256 quads. Thus, in the case where each quad status code is stored using 2 bits, the warp manager 34 will prepare a (worst case) 512 bit buffer storing a 2-bit suspend state indication for each quad.

The warp manager 34 will track the thread group (warp) responses to determine when all the warps from a sub-task have responded (and been suspended, as appropriate). It will then, as shown in FIG. 3, send to the core frontend 37 a suspend state indication (ST_SUSPENDED) for the sub-task in question, together with the corresponding sub-task warp status buffer. If all warps in a sub-task were completed (WARP_DONE), then the warp manager responds with a sub-task suspend state of "sub-task done" (ST_DONE). If any warps within the sub-task were suspended (i.e. have the state WARP_SUSPENDED), then the warp manager will return a sub-task suspend state of sub-task "suspended" (ST_SUSPENDED).

When it receives the sub-task suspend status indication and the corresponding sub-task warp suspend status buffer, the command frontend 37 writes the sub-task warp suspend status buffer to memory for future use.

Again, the sub-task are suspended and respond in their linear issue (age) order, and so the core frontend simply writes the relevant sub-task warp suspend status buffers to the memory in linear order.

The above operation is repeated for each sub-task (e.g. primitive) within the task (e.g. draw call) that is being suspended. Again, an appropriate sub-task suspend status buffer indicating the suspend status of all the sub-tasks within the task in question is stored, so that the suspend status of the sub-tasks within the task can be identified when processing of the render output is to be resumed.

Again, in the present embodiments, the sub-tasks are all correspondingly suspended in the sub-task issue (age) order, as that again simplifies the buffering of the data (as the warp manager will only need to maintain and manage a single sub-task suspend status buffer at any one time), and reduces the amount of data that needs to be stored to keep track of the sub-tasks' suspended status.

(Other arrangements, such as the writing of the suspend status indications with appropriate identifiers (which would then avoid the need to write the suspend status indications in strict linear order) could be used if desired, albeit at the expense of the need to store additional data.)

FIG. 10 illustrates this operation of the warp manager 34. Thus as shown in FIG. 10, in response to the sub-task suspend command, the warp manager will issue a thread group (warp) suspend command for each thread group in the sub-task in question (step 70) and then wait for all the thread groups (warps) in the sub-task to be suspended (step 71), before returning a sub-task suspended status indication to the core frontend (step 72).

Once all the sub-tasks (e.g. primitives) for the given task have been appropriately suspended, then the core frontend responds with an appropriate task suspend status signal (TASK_SUSPENDED) to the job manager 35 via the job control network 36, based on the returned suspend status for all the sub-tasks for the task in question. If all the sub-tasks are in the suspend status "done", the task response is that the task is done (TASK_DONE). Otherwise (i.e. in the case where some of the sub-tasks at least were suspended), the task response is that the task was suspended (TASK_SUSPENDED).

This is repeated for each task that falls to be suspended when the command to suspend the processing is received.

Once all the currently active tasks have been suspended and the status of all the necessary tasks has been returned, the core frontend responds to the job manager 35 with a "DONE" signal (or similar), to indicate that the suspend operation has been completed.

The job manager also correspondingly maintains and stores a record of the suspend status of all the tasks, so that the tasks that need to be resumed, etc., when processing of the render output is resumed, can be identified.

The above describes the operation when processing of a render output is to be suspended. As will be appreciated from the above, as the processing of the render output that been suspended has not been completed, the processing of the render output will need to be resumed at a later time.

In the present embodiments, the resume operation is essentially the reverse (the inverse) of the above-described suspend operation.

Thus, when the processing of a suspended render output is to be resumed (e.g., as indicated by the relevant driver), the job manager 35 will send an appropriate resume command to the graphics processing pipeline, which resume command will, inter alia, be propagated to the shader core (fragment shading stage) 31. This then triggers the core frontend 37 to start the resume operation.

The core frontend 37 will then, using the stored task suspend status indications (buffer), identify those tasks whose processing was completed when the suspend command was received (and so that do not need processing again for the resume operation), those tasks which were suspended when the suspend command was received (and so whose processing will need to be completed).

Thus, for any suspended task, the core frontend 37 will issue a resume command (ST_RESUME) for each sub-task (e.g. primitive) for that task to the warp manager 34.

In response to the sub-task resume command, the warp manager 34 will correspondingly identify all the thread groups (warps) within that sub-task, and for each thread group then issue a corresponding thread group resume (WARP_RESUME) command to the thread group (warp) scheduler 40.

In response to the sub-task resume command, the warp manager 34 will retrieve the sub-task warp status buffer from the memory, and determine therefrom which sets of fragments for the sub-task in question were status "QUAD DONE", and which were status "QUAD SUSPENDED". The warp manager 34 will then issue thread groups (warps) to the warp scheduler 40 for the processing of the sets of fragments to be resumed accordingly.

Thus for sets of fragments with status "QUAD DONE" (i.e. that have already been completed), the warp manager 34 will not spawn thread groups (warps) (as they should not be run again).

For any set of fragments having a status "QUAD_SUSPENDED" and for which the warp manager 34 thus issues a corresponding thread group, the warp scheduler 40 will issue that thread group to the programmable execution unit for execution 32, using a "RESUME" mode of operation for the thread group (warp) (as the thread group (warp) for any set of fragments with status "QUAD_SUSPENDED", should be run again, but resuming at the appropriate point in the shader program execution).

The resume operation for a thread group (warp) is shown in FIG. 8.

Thus, as shown in FIG. 8, for a thread group (warp) whose shader program execution is to be resumed, the previously stored warp state will first be loaded from memory (step 80). The corresponding register file content for the thread group in question will then also be loaded from memory into the appropriate registers for the thread group (step 81).

Once the register file has been loaded (step 82), then the issuing of instructions for execution by the thread group (warp) will be resumed, starting at the current instruction for the thread group indicated by the stored warp state (e.g., by using the stored program count (PC) for the thread group as an indirect branch into the shader program being executed) (step 83).

In the present embodiments, the resume operation illustrated in FIG. 8 is again performed by executing a thread group "RESUME ROUTINE" as a micro-coded sequence in the message block 41 of the shader core, e.g. as a prologue to starting the shader program execution itself.

An exemplary instruction sequence for this resume routine is shown below:
LOAD.i128.pack.estream r0:r3 suspend_buffer_base
LOAD.i128.pack.estream r4:r7 suspend_buffer_base+16
LOAD.i128.pack.estream r8:r11 suspend_buffer_base+32
LOAD.i128.pack.estream r12:r15 suspend_buffer_base+48
LOAD.i128.pack.estream r16:r19 suspend_buffer_base+64 LOAD.i128.pack.estream r20: r23 suspend_buffer_base+80
LOAD.i128.pack.estream r24:r27 suspend_buffer_base+96
LOAD l128.pack.estream r28: r31 suspend_buffer_base+112
LOAD_STATE.pack.estream suspend_buffer_base+128// Indirect branch into shader Again, this instruction sequence comprises a sequence of load instructions that load the relevant register content from the memory into the registers for the thread group (warp) whose processing is being resumed, followed by a LOAD_STATE instruction which loads the required thread group (warp) state from the memory (and which will, among other things, update the program count (PC) in the warp state to thereby indicate the next instruction to be executed when the shader program execution is resumed for the thread group (warp)).

When the resume routine has completed, then an indication that the shader program execution for the thread group has been successfully resumed (WARP RESUMED) is sent to the warp manager 34 (step 84). (Again, an error signal could be returned in the case that for some reason the resume sequence failed.)

This operation is repeated for each thread group (warp) in the sub-task in question whose shader program execution is to be resumed (whose shader program execution was previously suspended partway through).

Again, the warp manager 34 will track the thread group (warp) responses to determine when all the warps from a sub-task have been resumed (as appropriate). It will then send to the core frontend 37 a resume state indication (ST_RESUMED) for the sub-task in question.

This operation is repeated for each sub-task within the task that is being resumed.

FIG. 9 illustrates this operation of the warp manager 34. Thus as shown in FIG. 9, in response to a sub-task resume command, the warp manager will issue a thread group (warp) resume command for each thread group in the sub-task in question (step 90) and then wait for all the thread groups (warps) in the sub-task to be resumed (step 91), before returning a sub-task resumed status indication to the core frontend (step 92).

Once all the sub-tasks of a given task have been appropriately resumed, then the core frontend can again respond with an appropriate task resume status signal to the job manager 35.

This is repeated for each task that falls to be resumed when the command to resume the processing is received.

The outstanding tasks for the render output in question will then be executed to completion (or until another suspend command is received).

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a graphics processor, wherein the graphics processor executes a graphics processing pipeline that is operable to process graphics primitives to generate a render output, the graphics processing pipeline comprising, in sequence:
   a first section in which graphics primitives are processed in a first order in which they were initially issued into the graphics processing pipeline;
   a second section including one or more graphics processing circuits that operate on graphics primitives input to the second section of the graphics processing pipeline from the first section to generate from graphics primitives input to the second section respective sets of one or more graphics fragments to be rendered for the render output, wherein primitives in the second section of the graphics processing pipeline are processed in a second, different order; and
   a rendering circuit for rendering respective sets of one or more graphics fragments received from the second section of the graphics processing pipeline;
the method comprising:
   in response to a command to suspend processing of a render output being generated by the graphics processor:
   the graphics processor stopping issuing any new primitives associated with the render output into the graphics processing pipeline; and
   for a sequence of primitives currently being processed for the render output:
      determining primitives within the sequence of primitives currently being processed that are currently in the second section of the graphics processing pipeline;
      continuing the processing in the second section of the graphics processing pipeline for primitives determined to currently be in the second section of the graphics processing pipeline to generate from the primitives respective sets of one or more graphics fragments for rendering; and
      for each respective set of one or more graphics fragments generated from the processing in the second section of the graphics processing pipeline of a primitive that was determined to be in the second section of the graphics processing pipeline when the command to suspend processing was received:
 passing the set of one or more graphics fragments generated from the processing of the primitive in the second section of the graphics processing pipeline to the rendering circuit and then suspending the processing in respect of the respective set of one or more graphics fragments; and
 writing out a set of suspend operation state information for the set of one or more graphics fragments indicating that the processing in respect of the set of one or more graphics fragments was suspended.

2. The method of claim 1, wherein the rendering circuit includes a programmable execution unit operable to execute fragment shader programs for rendering sets of graphics fragments received from the second section, and in which when executing a fragment shader program, the programmable execution unit executes the fragment shader program for respective execution threads corresponding to respective fragments, each execution thread having an associated set of registers for storing data for the execution thread;
 wherein the step of passing the set of one or more graphics fragments generated from the processing of the primitive in the second section of the graphics processing pipeline to the rendering circuit and then suspending the processing in respect of the respective set of one or more graphics fragments comprises:
  generating a group of one or more execution threads corresponding to the set of one or more graphics fragments for executing a respective fragment shader program for rendering the set of one or more graphics fragments; and
  suspending the execution of the fragment shader program by the group of one or more execution threads for the set of one or more graphics fragments.

3. The method of claim 2, wherein suspending the execution of the fragment shader program for the set of one or more graphics fragments comprises:
 loading into the associated sets of registers for the group of one or more execution threads for the fragment shader program a set of input data values for rendering the set of graphics fragments; and then
 suspending the execution of the fragment shader program for the set of graphics fragments and writing out the current content of the sets of registers for the group of one or more execution threads executing the fragment shader program.

4. The method of claim 1, wherein in response to the command to suspend processing of a first render output being generated by the graphics processor, the method comprises: the graphics processor stopping processing of graphics primitives in the sequence of graphics primitives currently in the first section of the graphics processing pipeline.

5. The method of claim 1, comprising writing out the current rendered fragment data generated from the processing of the graphics primitives in the sequence of graphics primitives for the first render output after any outstanding processing for any primitives for the suspend operation is complete.

6. The method of claim 1, wherein the processing in the second section of the graphics processing pipeline includes a step of early depth/stencil testing, the method comprising writing out the current depth/stencil buffer.

7. The method of claim 1, wherein the graphics processor is a tile-based rendering system, and wherein the first render output is a tile, or set of tiles.

8. The method of claim 1, further comprising: the graphics processor receiving a command to resume processing of the render output, and in response to receiving a command to resume processing of the render output:
 loading in for a sequence of primitives that was being processed for the render output when the processing was suspended a set of suspend operation status information indicating for which primitives in the sequence of primitives the processing was previously suspended;
 determining based on the set of suspend operation status information a section of primitives in respect of which the processing was previously suspended;
 issuing the primitives for which it is determined that the processing was previously suspended into the graphics processing pipeline and repeating at least some of the processing for the primitives in the graphics processing pipeline to generate from the primitives respective sets of one or more graphics fragments for rendering; and
 passing the generated sets of one or more graphics fragments to the rendering circuit for rendering to continue generating the render output.

9. The method of claim 8, wherein the rendering circuit includes a programmable execution unit operable to execute fragment shader programs for rendering sets of graphics fragments received from the second section, and in which when executing a fragment shader program, the programmable execution unit executes the fragment shader program for respective execution threads corresponding to respective fragments, each execution thread having an associated set of registers for storing data for the execution thread;
 wherein the step of passing the set of one or more graphics fragments generated from the processing of the primitive in the second section of the graphics processing pipeline to the rendering circuit and then suspending the processing in respect of the respective set of one or more graphics fragments comprises:
  generating a group of one or more execution threads corresponding to the set of one or more graphics fragments for executing a respective fragment shader program for rendering the set of one or more graphics fragments; and
  suspending the execution of the fragment shader program by the group of one or more execution threads for the set of one or more graphics fragments,
 wherein suspending the execution of the fragment shader program for the set of one or more graphics fragments comprises:
  loading into the associated sets of registers for the group of one or more execution threads for the fragment shader program a set of input data values for rendering the set of graphics fragments; and then
  suspending the execution of the fragment shader program for the set of graphics fragments and writing out the current content of the sets of registers for the group of one or more execution threads executing the fragment shader program;
  the method further comprising re-loading the register content that was written out when suspending the execution of the fragment shader program for the set of graphics fragments into respective registers for execution threads of the programmable execution unit when execution of the fragment shader program for the set of graphics fragments is resumed.

10. A method of operating a graphics processor, wherein the graphics processor executes a graphics processing pipeline that is operable to process graphics primitives to generate a render output, the graphics processing pipeline comprising, in sequence:
a first section in which graphics primitives are processed in a first order in which they were initially issued into the graphics processing pipeline;
a second section including one or more graphics processing circuits that operate on graphics primitives input to the second section of the graphics processing pipeline from the first section to generate from graphics primitives input to the second section respective sets of one or more graphics fragments to be rendered for the render output, wherein primitives in the second section of the graphics processing pipeline are processed in a second, different order; and
a rendering circuit for rendering respective sets of one or more graphics fragments received from the second section of the graphics processing pipeline;
the method comprising:
in response to a command to resume processing of a render output that was previously suspended:
the graphics processing loading in for a sequence of primitives that was being processed for the render output when the processing was suspended a set of suspend operation status information indicating for which primitives in the sequence of primitives the processing was previously suspended;
determining based on the set of suspend operation status information a section of primitives in respect of which the processing was previously suspended;
issuing the primitives for which it is determined that the processing was previously suspended into the graphics processing pipeline and repeating at least some of the processing for the primitives in the graphics processing pipeline to generate from the primitives respective sets of one or more graphics fragments for rendering; and
passing the generated sets of one or more graphics fragments to the rendering circuit for rendering to continue generating the render output.

11. The method of claim 10, wherein for any sets of one or more graphics fragments suspend operation status information indicates that the processing was completed before the processing was suspended, the rendering is not repeated.

12. A graphics processor, wherein the graphics processor comprises a plurality of processing circuits configured to execute a graphics processing pipeline that is operable to process graphics primitives to generate a render output, the graphics processing pipeline comprising, in sequence:
a first section in which graphics primitives are processed in a first order in which they were initially issued into the graphics processing pipeline;
a second section including one or more graphics processing circuits that operate on graphics primitives input to the second section of the graphics processing pipeline from the first section to generate from each of the graphics primitives input to the second section a respective set of one or more graphics fragments to be rendered for the render output, wherein primitives in the second section of the graphics processing pipeline are processed in a second, different order;
a rendering circuit for rendering respective sets of one or more graphics fragments received from the second section of the graphics processing pipeline; and
a control circuit that is configured to operate the graphics processor such that:
in response to a command to suspend processing of a render output being generated by the graphics processor:
the control circuit causes the graphics processor to stop issuing any new primitives associated with the render output into the graphics processing pipeline; and
for primitives within a sequence of primitives currently being processed for the render output that are determined to currently be in the second section of the graphics processing pipeline:
the control circuit causes the graphics processor to continue the processing in the second section of the graphics processing pipeline for the primitives determined to currently be in the second section of the graphics processing pipeline to generate from the primitives respective sets of one or more graphics fragments for rendering and to pass each respective set of one or more graphics fragments generated from the processing in the second section of the graphics processing pipeline of a primitive that was determined to be in the second section of the graphics processing pipeline when the command to suspend processing was received to the rendering circuit;
the control circuit being further configured to suspend the processing in respect of a set of one or more graphics fragments generated from the processing in the second section of the graphics processing pipeline of a primitive that was determined to be in the second section of the graphics processing pipeline when the command to suspend processing was received after the set of one or more graphics fragments has been passed to the rendering circuit; and
the control circuit causing a write-out circuit to write out a set of suspend operation state information for the set of one or more graphics fragments indicating that the processing in respect of the set of one or more graphics fragments was suspended.

13. The graphics processor of claim 12, wherein the rendering circuit includes a programmable execution unit operable to execute fragment shader programs for rendering sets of graphics fragments received from the second section, and in which when executing a fragment shader program, the programmable execution unit executes the fragment shader program for respective execution threads corresponding to respective fragments, each execution thread having an associated set of registers for storing data for the execution thread;
wherein the control circuit is configured to suspend the processing in respect of a set of one or more graphics fragments generated from the processing in the second section of the graphics processing pipeline of a primitive that was determined to be in the second section of the graphics processing pipeline when the command to suspend processing was received by:
suspending the execution of a fragment shader program for rendering the set of one or more graphics fragments executing on a group of one or more execution threads of a fragment shader corresponding to the set of one or more graphics fragments.

14. The graphics processor of claim 13, wherein suspending the execution of the fragment shader program for the set of one or more graphics fragments comprises:
the control circuit causing a read-in circuit associated with the rendering circuit to load into the associated sets of registers for the group of one or more execution threads for the fragment shader program a set of input data values for rendering the set of graphics fragments; and then the control circuit suspending the execution of the fragment shader program for the set of graphics fragments and causing the write-out circuit to write out the current content of the sets of registers for the group of one or more execution threads executing the fragment shader program.

15. The graphics processor of claim 14, wherein the write-out circuit is configured to write out register content in such a manner that when execution of the fragment shader program for the set of graphics fragments is resumed the graphics processor is able to identify the set of one or more graphics fragments for which the fragment shader program was executing and re-load the register content that was written out when suspending the execution of the fragment shader program into respective registers for execution threads of the programmable execution unit.

16. The graphics processor of claim 12, wherein in response to the command to suspend processing of a first render output being generated by the graphics processor, the control circuit causes the graphics processor to stop processing of graphics primitives in the sequence of graphics primitives currently in the first section of the graphics processing pipeline.

17. The graphics processor of claim 12, wherein the write-out circuit is further configured to write out the current rendered fragment data generated from the processing of the graphics primitives in the sequence of graphics primitives for the first render output after any outstanding processing for any primitives for the suspend operation is complete.

18. The graphics processor of claim 12, wherein the processing in the second section of the graphics processing pipeline includes a step of early depth/stencil testing, and wherein the write-out circuit is further configured to write out the current depth/stencil buffer.

19. The graphics processor of claim 12, wherein the graphics processor is a tile-based rendering system, and wherein the first render output is a tile, or set of tiles.

20. The graphics processor of claim 12, wherein in response to a command to resume processing of a render output being generated by the graphics processor:

the control circuit causes a read-in circuit of the graphics processor to load in for a sequence of primitives that was being processed for the render output when the processing was suspended a set of suspend operation status information indicating for which primitives in the sequence of primitives the processing was previously stopped such that the graphics processing is operable to determine based on the set of suspend operation status information a section of primitives in respect of which the processing was previously stopped;

the control circuit then issuing the primitives for which it is determined that the processing was previously stopped into the graphics processing pipeline and repeating at least some of the processing for the primitives in the graphics processing pipeline to generate from the primitives respective sets of one or more graphics fragments for rendering to continue generating the render output.

21. A graphics processor, wherein the graphics processor comprises a plurality of processing circuits configured to execute a graphics processing pipeline that is operable to process graphics primitives to generate a render output, the graphics processing pipeline comprising, in sequence:

a first section in which graphics primitives are processed in a first order in which they were initially issued into the graphics processing pipeline;

a second section including one or more graphics processing circuits that operate on graphics primitives input to the second section of the graphics processing pipeline from the first section to generate from each of the graphics primitives input to the second section a respective set of one or more graphics fragments to be rendered for the render output, wherein primitives in the second section of the graphics processing pipeline are processed in a second, different order;

a rendering circuit for rendering respective sets of one or more graphics fragments received from the second section of the graphics processing pipeline; and a control circuit that is configured to operate the graphics processor such that:

in response to a command to resume processing of a render output being generated by the graphics processor:

the control circuit causes a read-in circuit of the graphics processor to load in for a sequence of primitives that was being processed for the render output when the processing was suspended a set of suspend operation status information indicating for which primitives in the sequence of primitives the processing was previously stopped such that the graphics processing is able to determine based on the set of suspend operation status information a section of primitives in respect of which the processing was previously stopped;

the control circuit then issuing the primitives for which it is determined that the processing was previously stopped into the graphics processing pipeline and repeating at least some of the processing for the primitives in the graphics processing pipeline to generate from the primitives respective sets of one or more graphics fragments for rendering to continue generating the render output.

22. The graphics processor of claim 21, wherein for any sets of one or more graphics fragments suspend operation status information indicates that the processing was completed before the processing was suspended, the rendering is not repeated.

23. A non-transitory computer readable storage medium storing computer software which when executing on a processor performs a method of operating a graphics processor, wherein the graphics processor executes a graphics processing pipeline that is operable to process graphics primitives to generate a render output, the graphics processing pipeline comprising, in sequence:

a first section in which graphics primitives are processed in a first order in which they were initially issued into the graphics processing pipeline;

a second section including one or more graphics processing circuits that operate on graphics primitives input to the second section of the graphics processing pipeline from the first section to generate from graphics primitives input to the second section respective sets of one or more graphics fragments to be rendered for the render output, wherein primitives in the second section of the graphics processing pipeline are processed in a second, different order; and a rendering circuit for rendering respective sets of one or more graphics fragments received from the second section of the graphics processing pipeline;

the method comprising:

in response to a command to suspend processing of a render output being generated by the graphics processor:

the graphics processor stopping issuing any new primitives associated with the render output into the graphics processing pipeline; and for a sequence of primitives currently being processed for the render output:

determining primitives within the sequence of primitives currently being processed that are currently in the second section of the graphics processing pipeline;

continuing the processing in the second section of the graphics processing pipeline for primitives determined to currently be in the second section of the graphics processing pipeline to generate from the primitives respective sets of one or more graphics fragments for rendering; and for each respective set of one or more graphics fragments generated from the processing in the second section of the graphics processing pipeline of a primitive that was determined to be in the second section of the graphics processing pipeline when the command to suspend processing was received:

passing the set of one or more graphics fragments generated from the processing of the primitive in the second section of the graphics processing pipeline to the rendering circuit and then suspending the processing in respect of the respective set of one or more graphics fragments; and writing out a set of suspend operation state information for the set of one or more graphics fragments indicating that the processing in respect of the set of one or more graphics fragments was suspended.

* * * * *